(12) United States Patent
Frieder et al.

(10) Patent No.: US 10,832,384 B2
(45) Date of Patent: *Nov. 10, 2020

(54) ENHANCING THE LEGIBILITY OF IMAGES USING MONOCHROMATIC LIGHT SOURCES

(71) Applicant: Georgetown University, Washington, DC (US)

(72) Inventors: Ophir Frieder, Chevy Chase, MD (US); Gideon Frieder, Potomac, MD (US); Jon Parker, Bethesda, MD (US)

(73) Assignee: Georgetown University, Washington, DC (US)

( * ) Notice: Subject to any disclaimer, the term of this patent is extended or adjusted under 35 U.S.C. 154(b) by 109 days.

This patent is subject to a terminal disclaimer.

(21) Appl. No.: 16/175,582

(22) Filed: Oct. 30, 2018

(65) Prior Publication Data

US 2019/0066273 A1 Feb. 28, 2019

Related U.S. Application Data

(63) Continuation of application No. 15/383,688, filed on Dec. 19, 2016, now Pat. No. 10,157,450, which is a (Continued)

(51) Int. Cl.
*G06T 5/00* (2006.01)
*H04N 1/58* (2006.01)
(Continued)

(52) U.S. Cl.
CPC ............ *G06T 5/002* (2013.01); *G06K 9/2018* (2013.01); *G06K 9/2027* (2013.01); *G06K 9/342* (2013.01); *G06K 9/38* (2013.01); *G06K 9/42* (2013.01); *G06T 5/001* (2013.01); *G06T 5/003* (2013.01); *G06T 5/005* (2013.01); *G06T 5/50* (2013.01); *G06T 7/13* (2017.01); *G06T 7/174* (2017.01); *G06T 7/90* (2017.01); *H04N 1/484* (2013.01);
(Continued)

(58) Field of Classification Search
CPC .......... G06T 5/001; G06T 7/0085; H04N 1/58
See application file for complete search history.

(56) References Cited

U.S. PATENT DOCUMENTS 4,929,979 A * 5/1990 Kimoto ............... H04N 1/4074
355/38
4,979,136 A 12/1990 Weiman et al.
(Continued)

OTHER PUBLICATIONS

International Search Report for PCT/US14/48042, dated Jul. 23, 2015, 4 pages.
(Continued)

*Primary Examiner* — Utpal D Shah
(74) *Attorney, Agent, or Firm* — Klarquist Sparkman, LLP

(57) ABSTRACT

A system and method are described for enhancing readability of document images by operating on each document individually. Monochromatic light sources operating at different wavelengths of light can be used to obtain greyscale images. The greyscale images can then be used in any desired image enhancement algorithm. In one example algorithm, an automated method removes image background noise and improves sharpness of the scripts and characters using edge detection and local color contrast computation.

21 Claims, 26 Drawing Sheets

Related U.S. Application Data continuation of application No. 15/001,027, filed on Jan. 19, 2016, now Pat. No. 9,528,802, which is a continuation-in-part of application No. 13/949,799, filed on Jul. 24, 2013, now Pat. No. 9,269,126.

(51) Int. Cl.
| | | |
|---|---|---|
| *G06T 7/13* | (2017.01) | |
| *G06K 9/20* | (2006.01) | |
| *G06K 9/38* | (2006.01) | |
| *H04N 1/48* | (2006.01) | |
| *G06T 7/174* | (2017.01) | |
| *G06T 7/90* | (2017.01) | |
| *G06K 9/34* | (2006.01) | |
| *G06K 9/42* | (2006.01) | |
| *G06T 5/50* | (2006.01) | |

(52) U.S. Cl.
CPC ..... *H04N 1/58* (2013.01); *G06T 2207/10008* (2013.01); *G06T 2207/10024* (2013.01); *G06T 2207/10152* (2013.01); *G06T 2207/20028* (2013.01); *G06T 2207/20182* (2013.01); *G06T 2207/20192* (2013.01); *G06T 2207/20221* (2013.01); *G06T 2207/30176* (2013.01)

(56) References Cited

U.S. PATENT DOCUMENTS

| | | | | |
|---|---|---|---|---|
| 5,146,097 | A * | 9/1992 | Fujiwara | G01N 21/57 250/359.1 |
| 5,617,485 | A | 4/1997 | Ohuchi et al. | |
| 5,917,935 | A | 6/1999 | Hawthorne et al. | |
| 6,195,467 | B1 | 2/2001 | Asimopoulos et al. | |
| 6,421,459 | B1 | 7/2002 | Rowe | |
| 6,466,693 | B1 | 10/2002 | Otsu et al. | |
| 6,804,395 | B1 | 10/2004 | Yoshida | |
| 7,016,536 | B1 | 3/2006 | Ling et al. | |
| 7,071,979 | B1 * | 7/2006 | Ohtani | H04N 1/484 235/462.42 |
| 7,184,080 | B2 | 2/2007 | Kehtamavaz et al. | |
| 7,400,768 | B1 | 7/2008 | Mayzlin | |
| 8,254,681 | B1 * | 8/2012 | Poncin | G06F 40/20 382/180 |
| 8,401,306 | B2 | 3/2013 | Dai | |
| 8,971,658 | B2 | 3/2015 | Lin et al. | |
| 2003/0104176 | A1 * | 6/2003 | Schwenk | D21H 21/48 428/195.1 |
| 2005/0078851 | A1 * | 4/2005 | Jones | B42D 25/00 382/100 |
| 2005/0111693 | A1 * | 5/2005 | Loce | H04N 1/387 382/100 |
| 2005/0179962 | A1 * | 8/2005 | Williamson | G02B 27/1013 358/473 |
| 2005/0237572 | A1 | 10/2005 | Mori et al. | |
| 2006/0109480 | A1 * | 5/2006 | Hidaka | G01Q 30/02 356/600 |
| 2006/0171587 | A1 | 8/2006 | Kanatsu | |
| 2006/0192957 | A1 * | 8/2006 | Frick | G01J 3/10 356/328 |
| 2006/0256388 | A1 | 11/2006 | Erol et al. | |
| 2006/0290950 | A1 | 12/2006 | Platt et al. | |
| 2007/0012777 | A1 * | 1/2007 | Tsikos | G06K 7/10732 235/454 |
| 2007/0189615 | A1 | 8/2007 | Liu et al. | |
| 2007/0217701 | A1 | 9/2007 | Liu et al. | |
| 2008/0278779 | A1 * | 11/2008 | Nishina | H04N 1/486 358/518 |
| 2008/0288888 | A1 * | 11/2008 | Kahle | G03B 21/10 715/781 |
| 2009/0012433 | A1 | 1/2009 | Fernstrom et al. | |
| 2009/0237750 | A1 * | 9/2009 | Tatsuno | H04N 1/0285 358/475 |
| 2010/0040282 | A1 * | 2/2010 | Bala | G06T 7/155 382/165 |
| 2010/0061629 | A1 | 3/2010 | Ma | |
| 2011/0134225 | A1 * | 6/2011 | Saint-Pierre | G01B 11/25 348/47 |
| 2011/0135325 | A1 * | 6/2011 | Hitaka | G03G 15/2039 399/21 |
| 2011/0194737 | A1 * | 8/2011 | Sharma | G06K 9/00577 382/112 |
| 2011/0229696 | A1 * | 9/2011 | Ratnukumar | G07D 7/187 428/172 |
| 2012/0141022 | A1 | 6/2012 | Tsutsumi | |
| 2012/0226600 | A1 * | 9/2012 | Dolev | G06Q 10/10 705/38 |
| 2012/0229872 | A1 * | 9/2012 | Dolev | G07D 7/2008 358/448 |
| 2013/0022270 | A1 * | 1/2013 | Kahle | G06K 9/6253 382/182 |
| 2013/0129247 | A1 | 5/2013 | Parker et al. | |
| 2014/0198354 | A1 * | 7/2014 | Akiba | H04N 1/4074 358/475 |
| 2014/0368526 | A1 | 12/2014 | Day et al. | |
| 2015/0030240 | A1 | 1/2015 | Frieder et al. | |
| 2015/0086068 | A1 * | 3/2015 | Mulhearn | G07D 7/206 382/100 |
| 2015/0212979 | A1 * | 7/2015 | Kahle | H04N 1/40062 358/474 |

OTHER PUBLICATIONS

Written Opinion for PCT/US14/48042, dated Jul. 23, 2015, 9 pages.

* cited by examiner

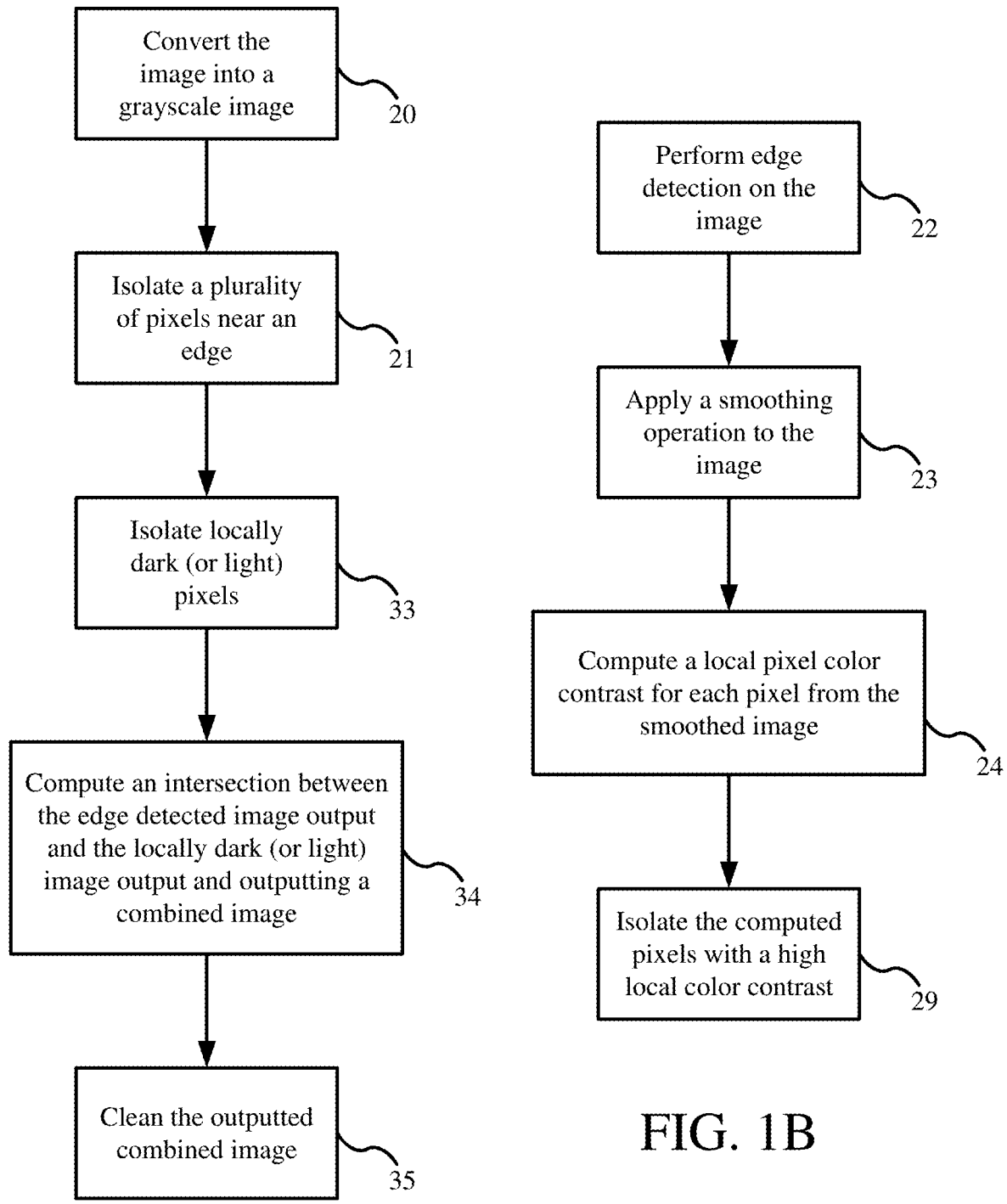

IMAGE USING FIRST MONOCHROMATIC LIGHT SOURCE WHEREIN CONTENT IS CAPTURED

1210

IMAGE USING SECOND MONOCHROMATIC LIGHT SOURCE

1220

IMAGE USING THIRD MONOCHROMATIC LIGHT SOURCE WHEREIN TEXTURE IS CAPTURED WITHOUT CONTENT

1230

SOFTWARE 1680 IMPLEMENTING DESCRIBED TECHNOLOGIES

ENHANCING THE LEGIBILITY OF IMAGES USING MONOCHROMATIC LIGHT SOURCES

CROSS REFERENCE TO RELATED APPLICATIONS

This is a continuation of Ser. No. 15/383,688, filed Dec. 19, 2016, which is a continuation of U.S. application Ser. No. 15/001,027, filed Jan. 19, 2016 (now U.S. Pat. No. 9,525,802), which is a continuation-in-part of U.S. application Ser. No. 13/949,799, filed Jul. 24, 2013 (now U.S. Pat. No. 9,269,126), which applications are incorporated by reference herein in their entirety.

BACKGROUND

All documents that are not properly preserved suffer degradation over time, and even the most rigorous preservation techniques can only slow degradation of physical documents. Degradation can occur for a variety of reasons, such as time, improper storage, poor environmental conditions, damage, and so on. Documents vulnerable to such stresses and degradation can contain valuable information, as in the case of found military/terrorism-related documents, historical documents, scanned legal documents, etc. Computerized scanning and imaging of such documents can "freeze" the state of the document at the time of imaging. The invention described enhances the frozen state, that is, increases the legibility of the document.

Additionally, some, documents are not highly legible at creation. Such, conditions can occur due to improper typing, improper writing, or improper media. The legibility of these documents can likewise be enhanced.

SUMMARY

Embodiments of described herein may be implemented by systems using one or more programmable digital computers and computer readable storage media. Disclosed are systems, methods, and computer readable storage products for performing a process on an image, the process being implemented by a computer system comprising at least one data storage device in which is stored image data, at least one computer and at least one computer readable medium storing thereon computer code which when executed by the at least one computer performs a method, the method comprising the at least one computer performing a set of operations on an image that renders the image from a first state to a second state, wherein the second state is more legible than then the first state. In an embodiment, the method comprises the at least one computer: converting the image into a grayscale image; isolating a plurality of pixels near an edge; isolating locally dark or light pixels; computing an intersection between the edge detected image output and the locally dark or light image output and outputting a combined black and white image; and cleaning the outputted combined image.

The converting of the image to a greyscale image includes using a plurality of monochromatic light sources to capture different greyscale images of the document. Some of the greyscale images provide good visualization of the content of the document, while other of the greyscale images provide a surface texture of the image without the content or with the content de-emphasized. The greyscale images can be combined such that the texture is subtracted out of the final greyscale image. The final greyscale image can be used as input to a variety of image enhancement algorithms, including, but not limited to, the algorithm described herein.

The isolating the plurality of pixels near an edge can further comprise: performing edge detection on the image; applying a smoothing operation to the image; computing the local color contrast for each pixel in the smoothed image; and isolating the pixels with high local color contrast.

The edge detection can be performed by any edge detection known in the art, including for example a Sobel operation, Canny, Canny-Deriche, Differential, or Prewitt Roberts Cross. The edge detection smoothing operation can be performed by any smoothing operation known in the art, including for example applying a Bilateral Filter.

The computation of the pixel's local color contrast from, the smoothed image can comprise: performing a local standard deviation (StdDev) operation on the smoothed image. The local StdDev operation can comprise, for each pixel of an image: identifying a square window around a home pixel; computing the standard deviation (StdDev) of the color values within the window of pixels; storing the StdDev color value of the pixel, and normalizing the computed StdDev values such that the values range from 0 to 255. As will be appreciated, other statistical measures known in the art can be applied.

The isolating pixels with a high local color contrast can comprise: performing clustering on the locally contrasted image. The clustering operation can be any known clustering method in the art, for example such as Otsu's Method or K-means clustering.

The isolating pixels with locally dark or light pixels can comprise: for each pixel of the original grayscale image: identifying a square window of the pixels centered around a home pixel, wherein the window is larger than a square window used when isolating the plurality of pixels near an edge; perform a clustering operation to the defined square window of pixels; and save the black or white color value of the home pixel. For example, the square window used for isolating locally dark or light pixels can be about 25% larger than the square window used to isolate pixels that are near an edge. The clustering operation can be known clustering methods such as, for example, Otsu's Method or K-means clustering.

The cleaning of the outputted combined image can comprise: removing stray pixels from a black and white image; and correcting any erroneous plateaus.

The removing of stray pixels from the black and white image can comprise, for each window of at least 9 pixels: counting the number of black pixels within the window; counting the number of white pixels within the window; detecting if a threshold number of pixels within the window are the opposite color of the home pixel; and if so, changing the color value of the home pixel to the opposite color value. The color value threshold can be at least 7 pixels.

Correcting erroneous plateaus can comprise, for identified plateaus: computing the mean and standard deviation of the original pixel colors in an island portion of the identified plateau; computing the mean and standard deviation of the original pixel colors in a border portion of the identified plateau; performing a statistical test on the plateau to determine if the island portion of the plateau is part of the border portion of the plateau; and if the island portion of the plateau is a part of the border portion of the plateau, correcting the identified erroneous plateau so the island portion and the border portion of the plateau are the same color value.

BRIEF DESCRIPTION OF THE DRAWINGS

FIGS. 1A-1G are flow charts presenting a computerized image processing method of enhancing the legibility and clarity of image data for documents.

FIGS. 8A-8D show original images compared against final enhanced images.

DETAILED DESCRIPTION

Figure 1C:
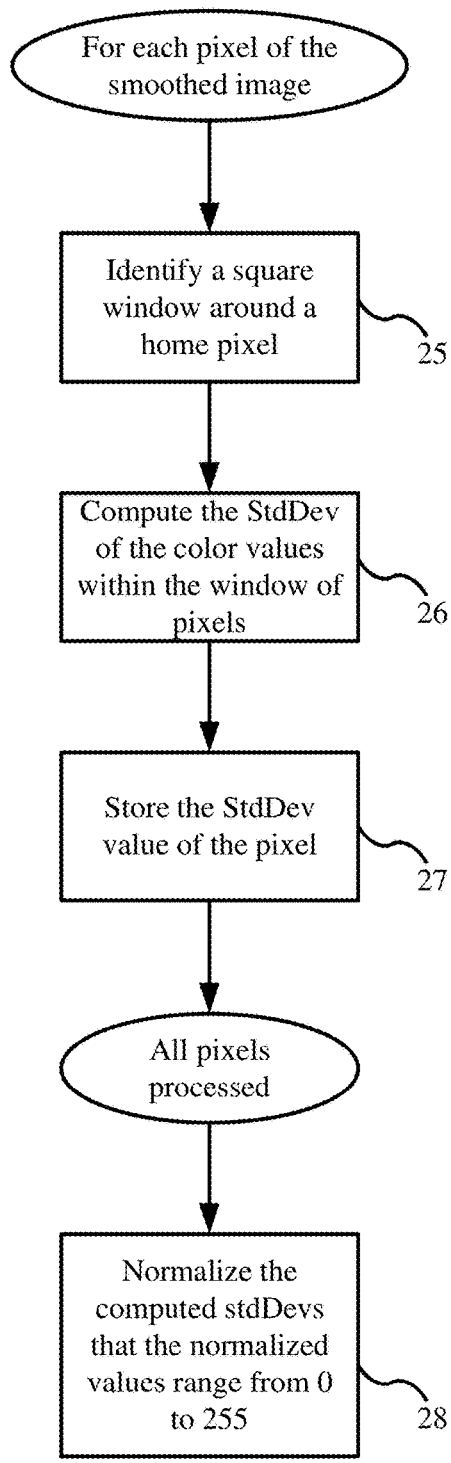

Embodiments of a system and method for enhancing readability of scanned document images are described herein. Embodiments as described herein operate on each document image individually, hence are completely data parallel. In certain embodiments of the disclosed invention no training data or document model is required unlike other approaches that require training data or a document model. Via principle component analysis, edge detection and a local color contrast computation, an automated (namely, user independent) method removes image background noise and improves sharpness of the scripts and characters.

In embodiments disclosed herein, document image enhancement is training set independent, document model independent, and document language agnostic. Embodiments are applicable to any application that processes scanned documents. These include the processing of found military/terrorism-related documents, historical documents, scanned legal documents, etc. In short, this method can be applied to any corpus of documents that are degraded. In various embodiments, at least one degraded image (e.g., due to degradation over time and/or due to improper storage) is provided as input and at least one black and white image clearly showing the content of the pre-degraded input image, including content intended to be readable or legible is derived as output.

It is to be understood that the figures and descriptions of the present invention are simplified to illustrate elements that are relevant for a clear understanding of the present invention, while eliminating, for purposes of clarity, many other elements which are conventional in this art. Those of ordinary skill in the art will recognize that other elements are desirable for implementing the present invention. Since such elements are well known in the art and do not facilitate a better understanding of the present invention, a discussion of such elements is not provided herein.

The present invention will now be described in detail on the basis of exemplary embodiments.

One embodiment discloses a method comprising: performing an automated (user independent) process on an image that renders the image from a first state to a second state, wherein the second state is more legible than the first state, wherein the process segregates dark pixels from light pixels. The analysis includes methodology and system configuration that embodies the assumed "truths" that (1) "writing" or "script" will be darker than the local pixels (i.e., background), and (2) "writing" or "script" should generate a detectable edge. Therefore, the logic takes advantage of these truths to find pixels within the scanned images that are both (1) darker than their neighbors and (2) near an edge. As will be understood, the first truth can be inverted for "negative" images, such as images of lithographs or negatives, in which case script is lighter than local pixels and the script will generate a detectable edge. As used herein, script or writing is to be construed broadly as any land of symbol, figure, script, icon, drawing, and so on intended to be legible.

FIGS. 1A-1G are flow charts presenting a method of enhancing the legibility and clarity of image data for documents according to an embodiment of the invention. The method is configured to work on an image, as for example a degraded image that is input into an image database as an image file (e.g., by scanning, digital photograph, etc.). An image as used herein is discussed on an image by image basis, (e.g., page by page), where each image is a "page" of a document in an image database; however, an original image should be broadly understood as a conventional image consistent with that as understood in the art. At FIG. 1A is shown a high level flow for embodiments whereby the system and method is configured to isolate script pixels based that are (a) proximate to an edge and (b) are either locally dark or locally light. In the embodiments described herein, locally dark pixels are isolated, however, as will be appreciated, the methods and systems can be readily configured to isolate and filter locally light pixels (e.g., for a negative).

In an embodiment, the method for performing a process on an image, is implemented by a computer system performing the method, the method comprising the at least one computer performing a set of operations on an image that renders the image from a first state to a second state, wherein the second state is more legible than then the first state, the operations comprising:

converting the image into a grayscale image 20;

isolating a plurality of pixels near an edge 21;

isolating locally dark (or light) pixels 33;

computing an intersection between the edge detected image output and the locally dark (or light) image output and outputting a combined image 34; and cleaning the outputted combined image 35.

With reference to FIG. 1A, at block 20, if the original image is in color, the image is first prepared by rendering into a grayscale image. The greyscale image can be produced using multiple monochromatic light sources having different wavelengths for generating greyscale images. The greyscale images can then be combined to produce a final greyscale image. One or more of the greyscale images can be produced with a focus on content, while other greyscale images are produced with a focus on the texture of the document (e.g., the texture of the medium). Combining of the greyscale images can result in the texture being subtracted out of the image so as to provide a more clear view of the content. An original image has Width w and Height h, resulting in n total pixels (n=w*h) for the image. For an image, each pixel is a 3-dimensional (3-d) vector: Pixel= (red$_i$, green$_i$, blue$_i$). The system is configured to flatten or compress the n3-d vectors into n1-d vectors, that is, into numerical values. The result is n numbers, one for each pixel. The greyscale image, when combined, also has numbers for each pixel that are added together. The resulting numbers can be normalized to range from 0 to 1. Converting images to greyscale images is discussed in more detail in FIGS. 11-15. The resultant greyscale image can be used in any number of imaging enhancement algorithms, one of which is shown in FIG. 1A.

Referring to FIG. 1A, at block 21 a pixel area for each pixel of the image is processed to isolate a plurality of pixels near an edge. In an embodiment shown in FIG. 1B, the method for isolating the plurality of pixels near an edge further comprises:

performing edge detection on the image 22;

applying a smoothing operation to the image 23;

computing the local color contrast for each pixel from the smoothed image 24; and isolating the pixels with high local color contrast 29.

Figure 3A:
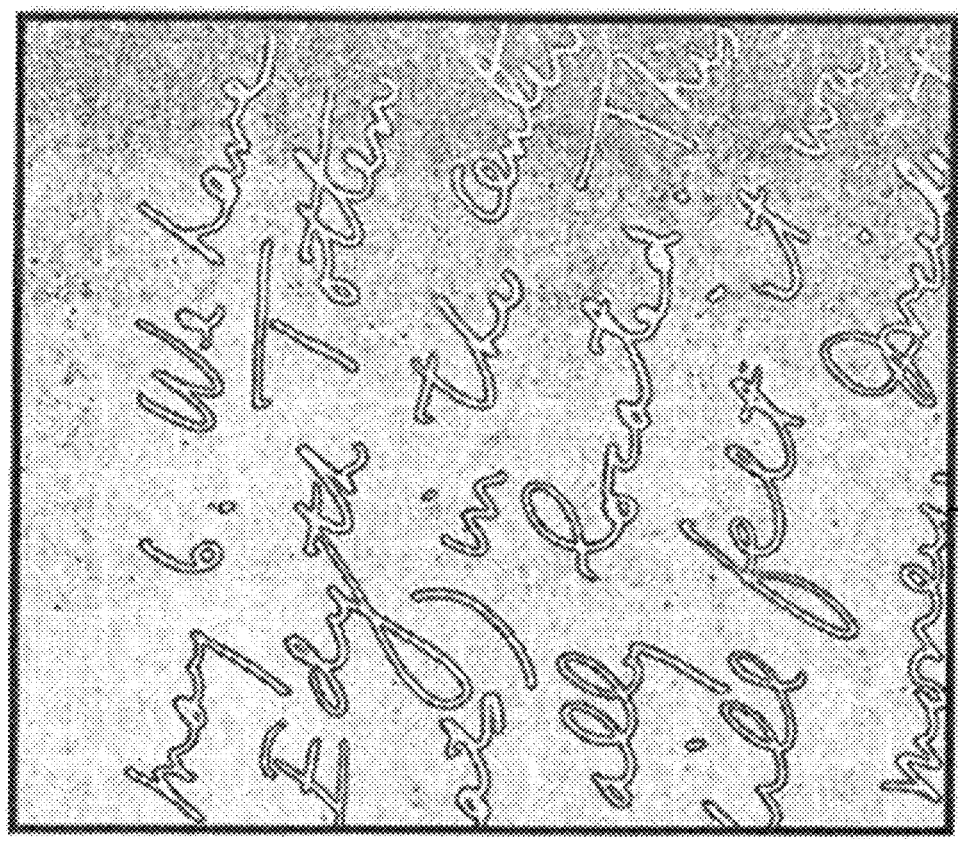
FIGS. 3A-3D shows exemplary views of intermediate image inputs and outputs.
Figure 3A:
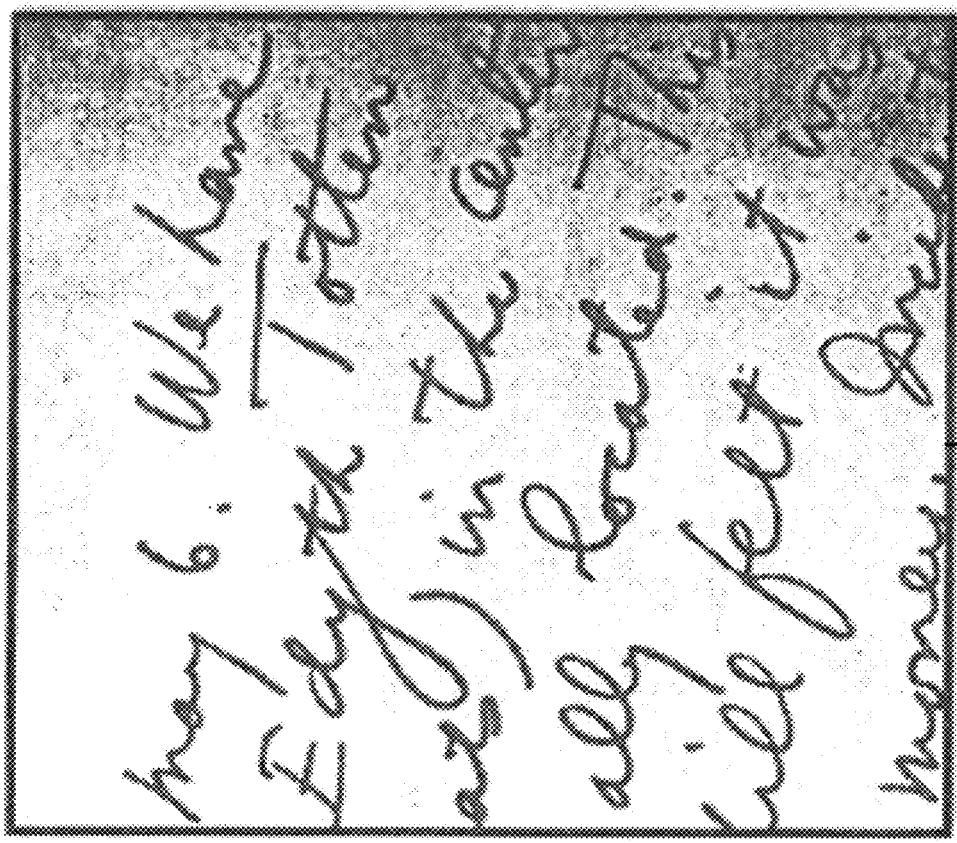

Turning to FIG. 1B, taking the grayscale image, at block 22, the method comprises determining if a pixel is proximate to an edge, an embodiment of which is shown at FIG. 1C. As shown at block 22 of FIG. 1B, the determination comprises performing edge detection on the grayscale image 202. Edge detection can be carried out using edge detection techniques known to ordinarily skilled artisans. As will be appreciated, image edge detection is a well-documented image processing topic, and includes techniques such as Sobel Operators, Canny Edge Detection, including Canny, Canny-Deriche, Differential, Sobel, Prewitt Roberts Cross, and others. In one embodiment, a Sobel Operation is performed. Edge detection works by computing or estimating a local color gradient for pixel areas. If the gradient is steep, edge detection proceeds on the basis that as colors or shades are changing quickly, there is an "edge." FIG. 3A shows a magnified view of a portion of the image input of grayscale image 202$a$, and the image output 206 after the determination edge detection is run using Sobel Edge detection. The resulting image lightens the areas where the shades are not changing quickly; it retains "edge" areas where shades are changing quickly. Consequently, in the output image 206, the pixels for script take an outlined appearance and the rest of the image having a "washed out" appearance. The result is that dark pixels typically form the boundary between text and non-text.

Figure 3B:
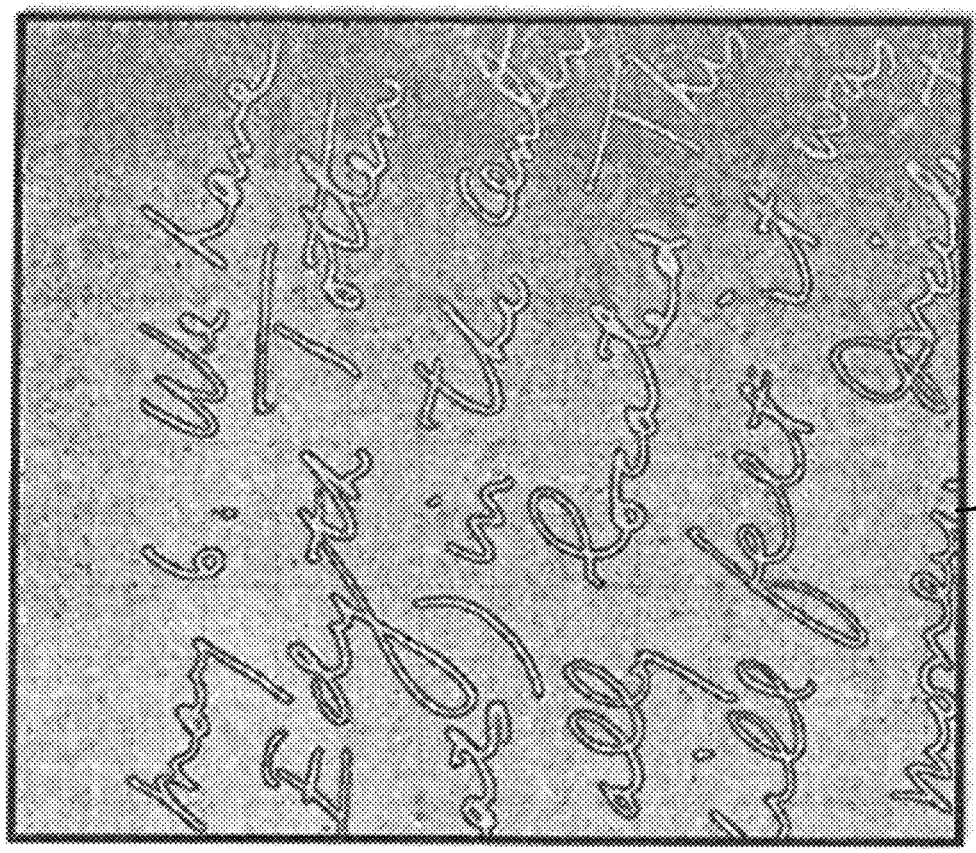
Figure 3B:
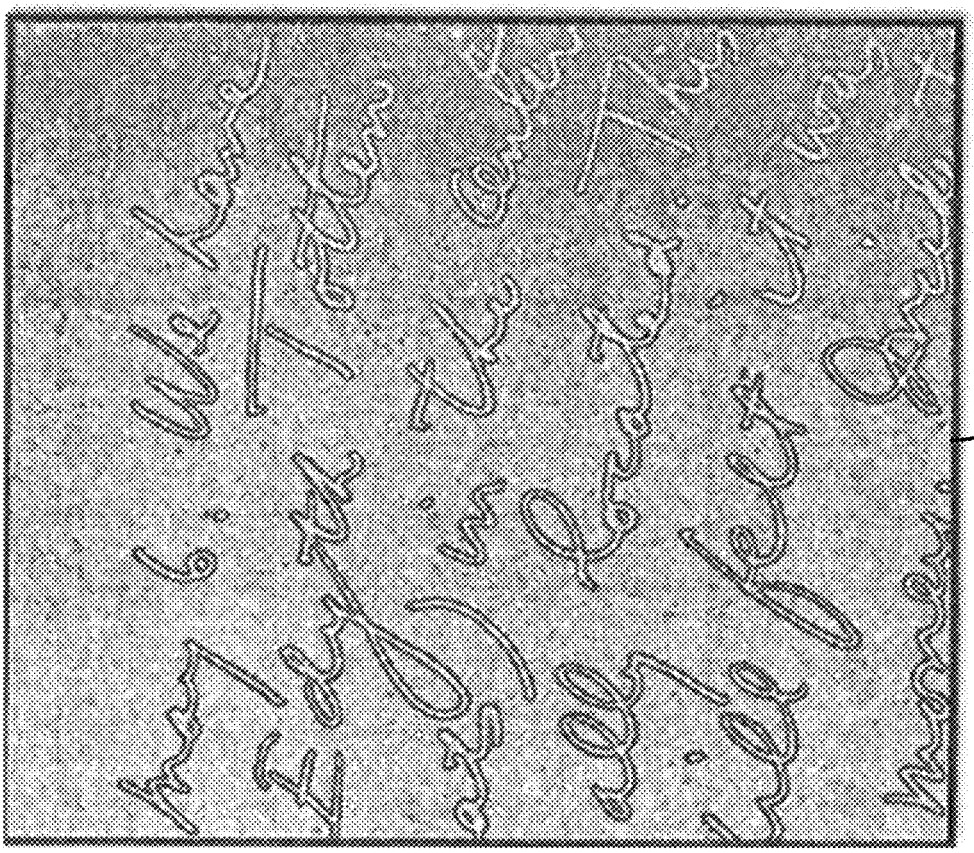

Next, as shown at block 23 of FIG. 1B, a smoothing operation is applied to the image. As shown in FIG. 3B in an exemplary embodiment of a smoothing function, a BiLateral Filter (BLF) is applied to the image 206 on which the Sobel Edge Detection was performed resulting in a smoothed image 208.

At block 24 of FIG. 1B, once the smoothing operation is performed, the system computes the local color contrast for each pixel. In an embodiment, the local color contrast for each pixel from the smoothed image is computed by performing a local standard deviation (StdDev) operation on the smoothed image. As shown in FIG. 1C, the local StdDev operation comprises for each pixel of the smoothed image: identifying a square window around a home pixel 25; computing the StdDev of the color values within the window of pixels 26; and storing the StdDev color value of the pixel 27.

Accordingly, starting at a block 25 of FIG. 1C, the local color contrast of the smoothed image 208 is computed. At block 25 of FIG. 1C, for each pixel of the smoothed image, a square window of pixels centered around a home pixel is identified. In one embodiment, a window of neighboring pixels is a square or pixels centered around a home pixel such as a "center" pixel. The number of pixels in the window is quadratic. That is to say a window size of 9 corresponds to a pixel area containing 81 pixels. This pixel area contains the home pixel, h and 80 neighboring pixels). A window size of 7 corresponds to a pixel area containing 49 pixels. A window size can take on the values of 3, 5, 7, 9, and so on. Each pixel is identified as a "home" pixel for an area including a plurality of pixels. For example, in an embodiment a 15 by 15 square pixel window is centered around a home pixel (i.e., 7 pixels on each of the sides of the home pixel). As will be appreciated, the area of the square about the home pixel can be enlarged (e.g., 17, 21) or reduced (e.g., 9, 13). However, as described at the appropriate section below, this window size will, be smaller than a window sized established when isolating locally dark pixels during the process. As will be noted, the pixel length for the window is an odd number as the number includes the home pixel and the even number of pixels surrounding the home pixel.

Figure 3C:
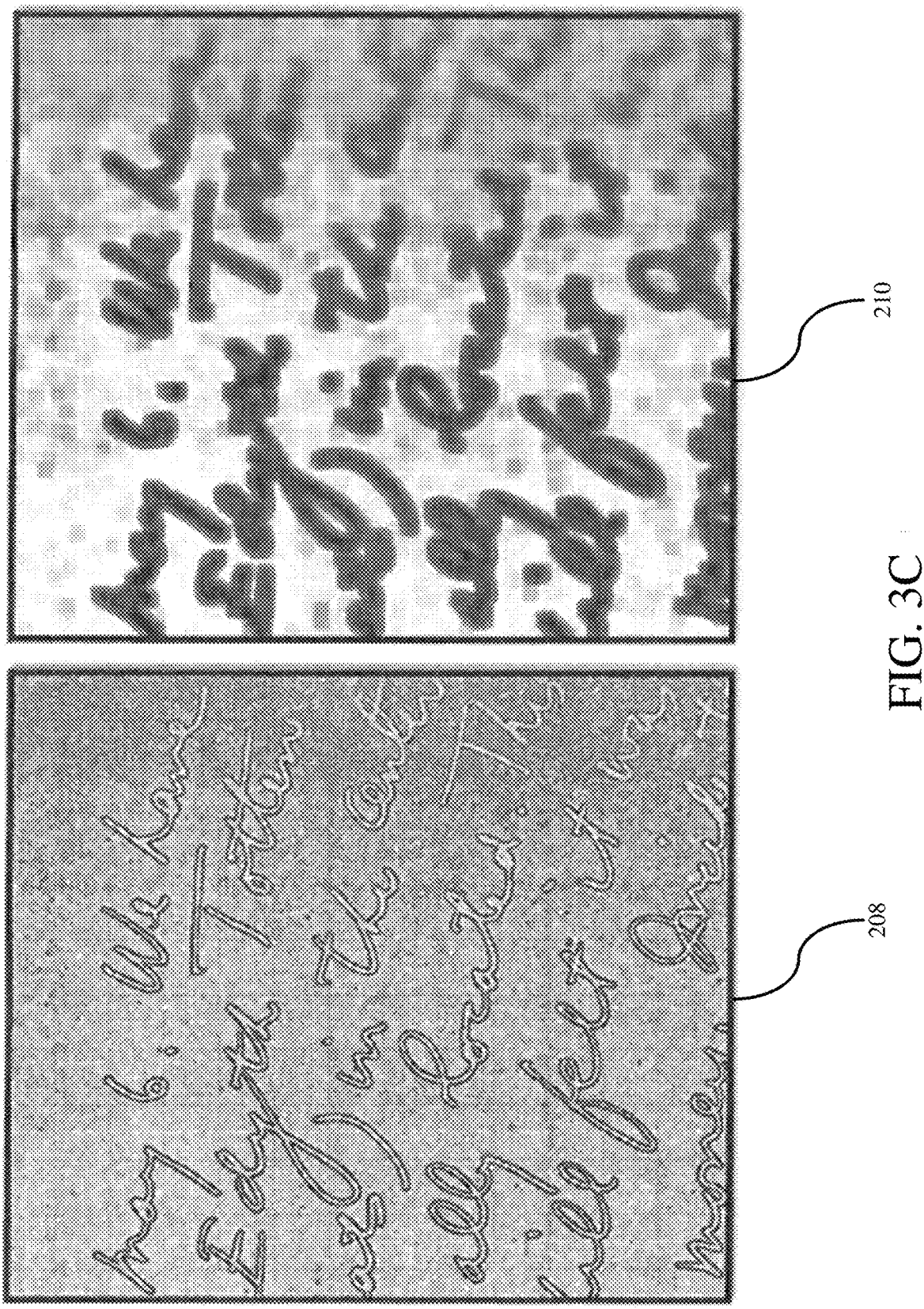

At block 26, the standard deviation of the colors within the window of pixels is calculated, and at block 27, the value is saved as a standard deviation value (StdDev). Once all the pixels are computed thus, at block 28 the stored StdDev values are normalized such that the values range from 0 to 255. As shown in the example of FIG. 3C, the resulting image depicts local color contrast 210 and is computed from the smoothed image 208 using the local StdDev operation.

Figure 3D:
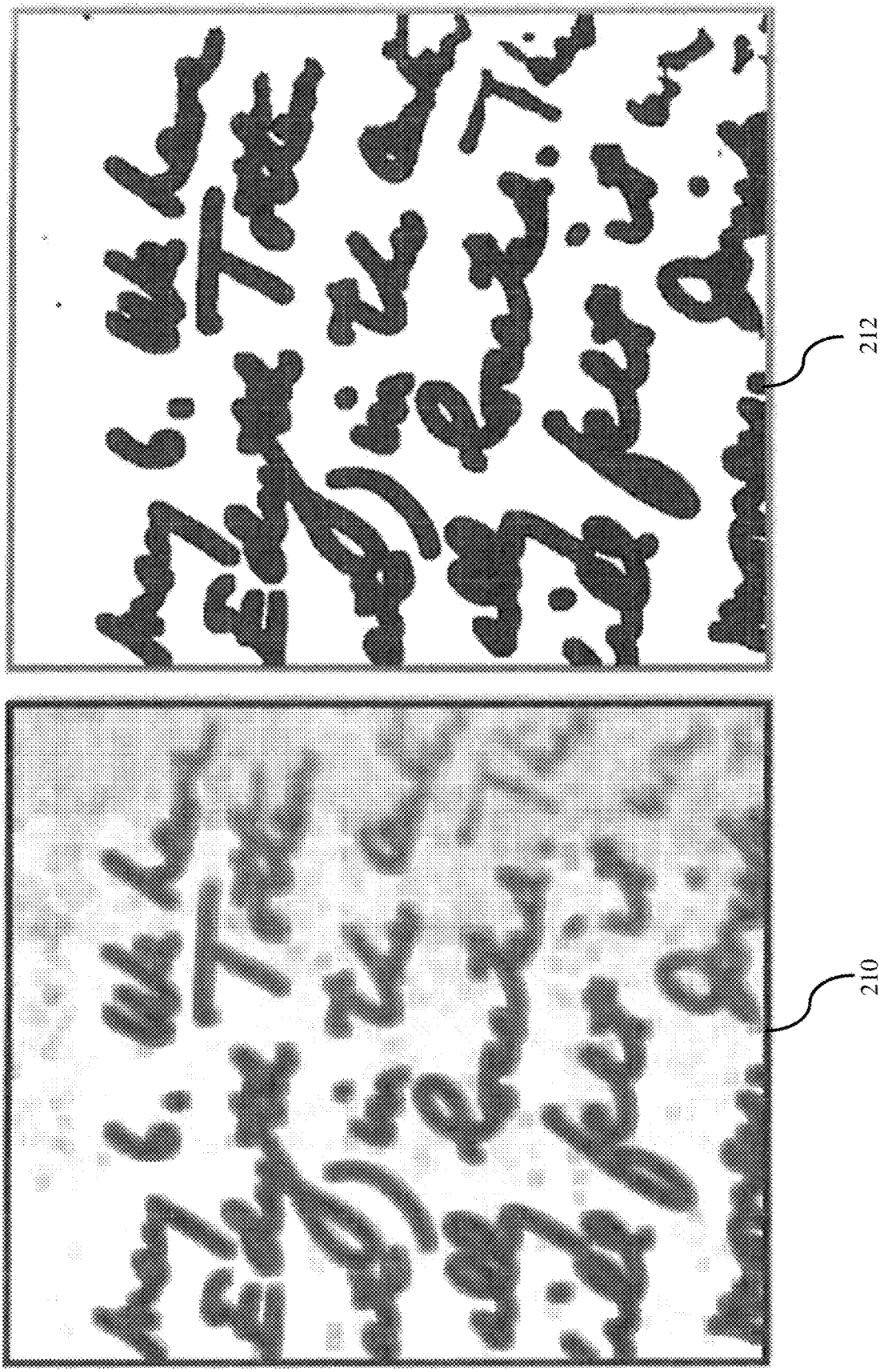

At block 29 of FIG. 1B, the method comprises isolating pixels that have a high local color contrast. The system can be configured to apply a clustering algorithm such as Otsu's Method, which is a computerized technique known to ordinarily skilled artisans for computer vision and image processing, which automatically performs histogram shape-based image thresholding, namely, the reduction of a grayscale image to a strictly black and white image (0,1). As shown at FIG. 3D, the application of Otsu's method to the Local StdDev output 210 of the smoothed image 208 outputs a high contrast black, and white binary image 212. As will lie appreciated, clustering methods other than Otsu's Method can be used, as for example K-means clustering.

Figure 1D:
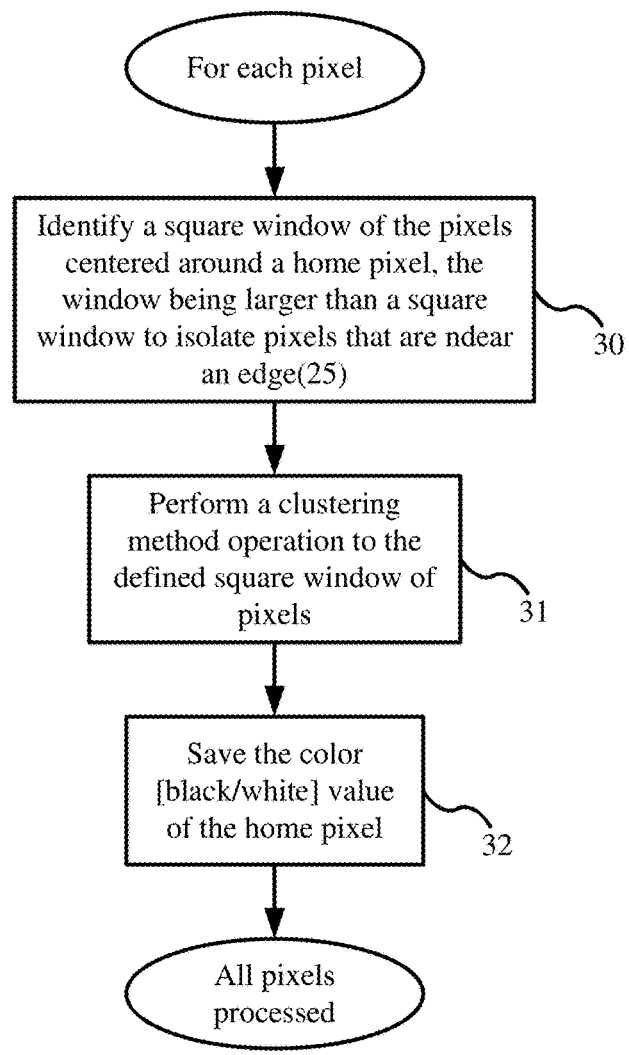

Returning to FIG. 1A, at block 33 the method comprises isolating script pixels based on a filter criterion that filters pixels that are locally dark (or light). Again, in the embodiments described herein, locally dark pixels are isolated, however, as will be appreciated, the methods and systems can be readily configured to isolate and filter locally light pixels (e.g., for a negative). In an embodiment, FIG. 1D shows a flow for computing the locally dark pixels. At block 30, with the original grayscale image 202 as input, for each pixel of the original grayscale image 202, a square window of the pixels centered around a home pixel is identified. The window is larger than a square window identified for a smoothed image during a Local StdDev operation at (as shown at block 25 of FIG. 1C). At block 31, the clustering operation such as Otsu's method or K-means clustering is applied to the defined square window of pixels, resulting in a binary values for each pixel, namely either black or white. At block 32, the system saves the black or white color value of the home pixel. The Otsu's method is applied thus to every pixel of the image 202.

As noted above the square window for the smoothed image as computed at blocks 25 of FIG. 1C when isolating pixels near an edge is smaller than the square window for the original grayscale image computed at block 30 of FIG. 1D when isolating locally dark or light pixels. For example, the square window computed at block 30 for the grayscaled image 202 can be about 25% larger than that computed at block 25. According to an embodiment, at block 30 the system can be configured to highlight a 21 by 21 square window of pixels centered around each home pixel of the grayscaled image 202, whereas a 15 by 15 window is employed as described above at block 25 of FIG. 1C. As will be appreciated, the size of these windows may vary, as the image cleaning process described below improves image legibility. It is the case, however, that the pixel window for the image processing at block 30 must be larger than that of blocks 25 as described above, for example between 20-40% larger.

Figure 4:
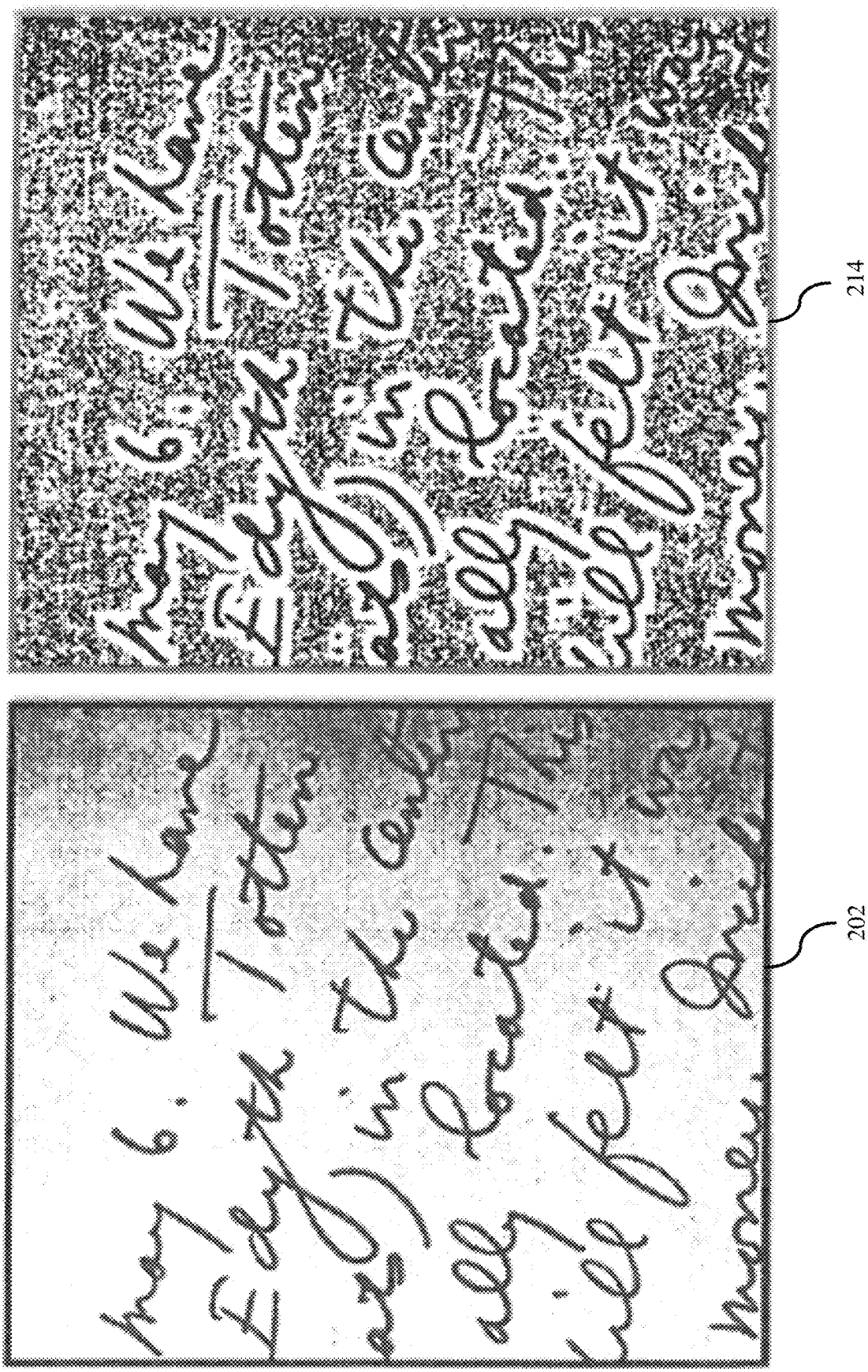
FIG. 4 shows a grayscale image and the set of locally dark pixels identified from that grayscale image.

At block 31 of FIG. 1D, a clustering method is applied to a window of pixels, and the white/black color of the home pixel is saved. This process is carried out for each pixel of the original image. As noted herein, while the clustering of the exemplary embodiment applies Otsu's method, any clustering method known in the art can be applied. As shown at FIG. 4, the application of Otsu's method to the original grayscale image 202 outputs a high contrast black and white binary image 214. In the image 214 is such that the script is black and has the appearance of stark white highlighting, while the remaining "background" is speckled in high contrast black and white depending on the grey shade values of the original grayscale image 202.

Figure 5:
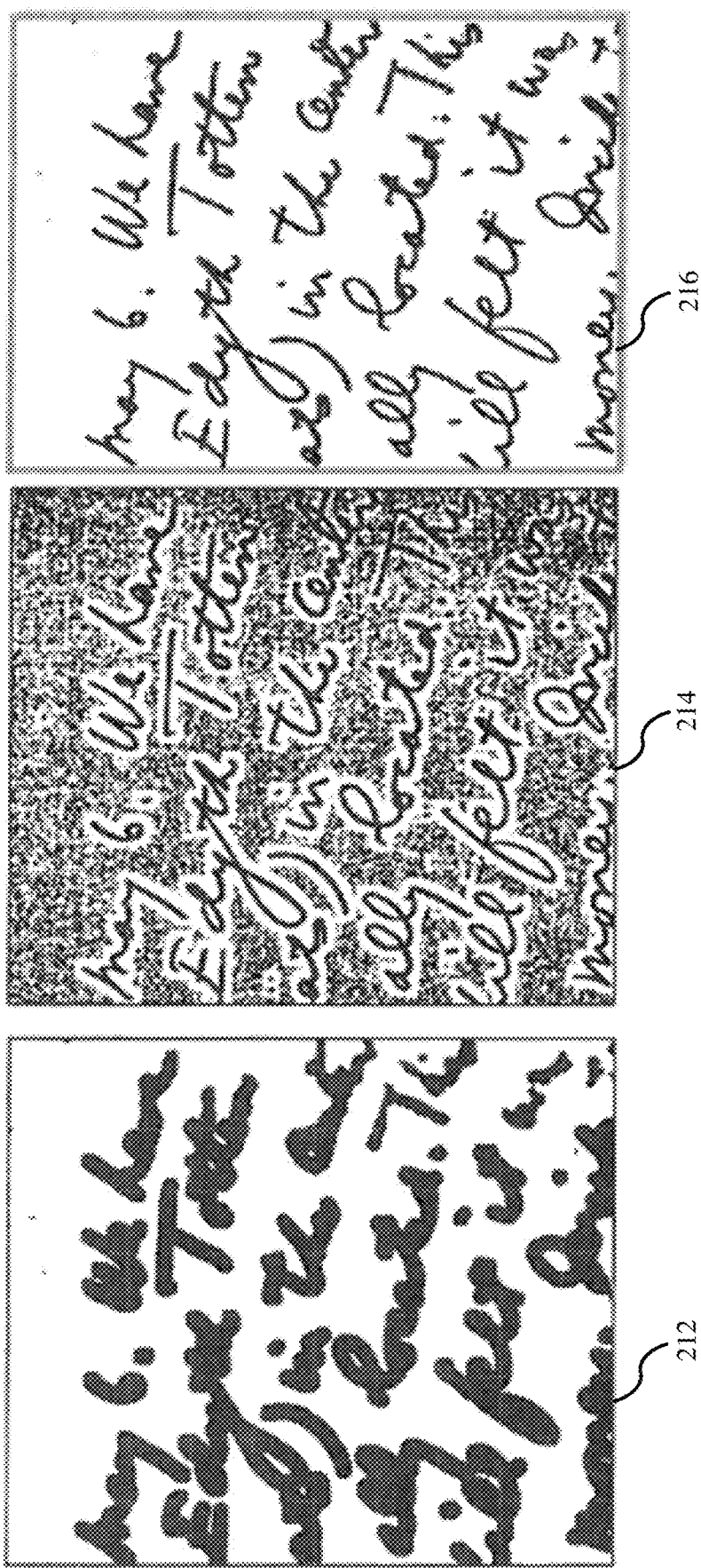
FIG. 5 shows image outputs and the combination of the output images.
Figure 6:
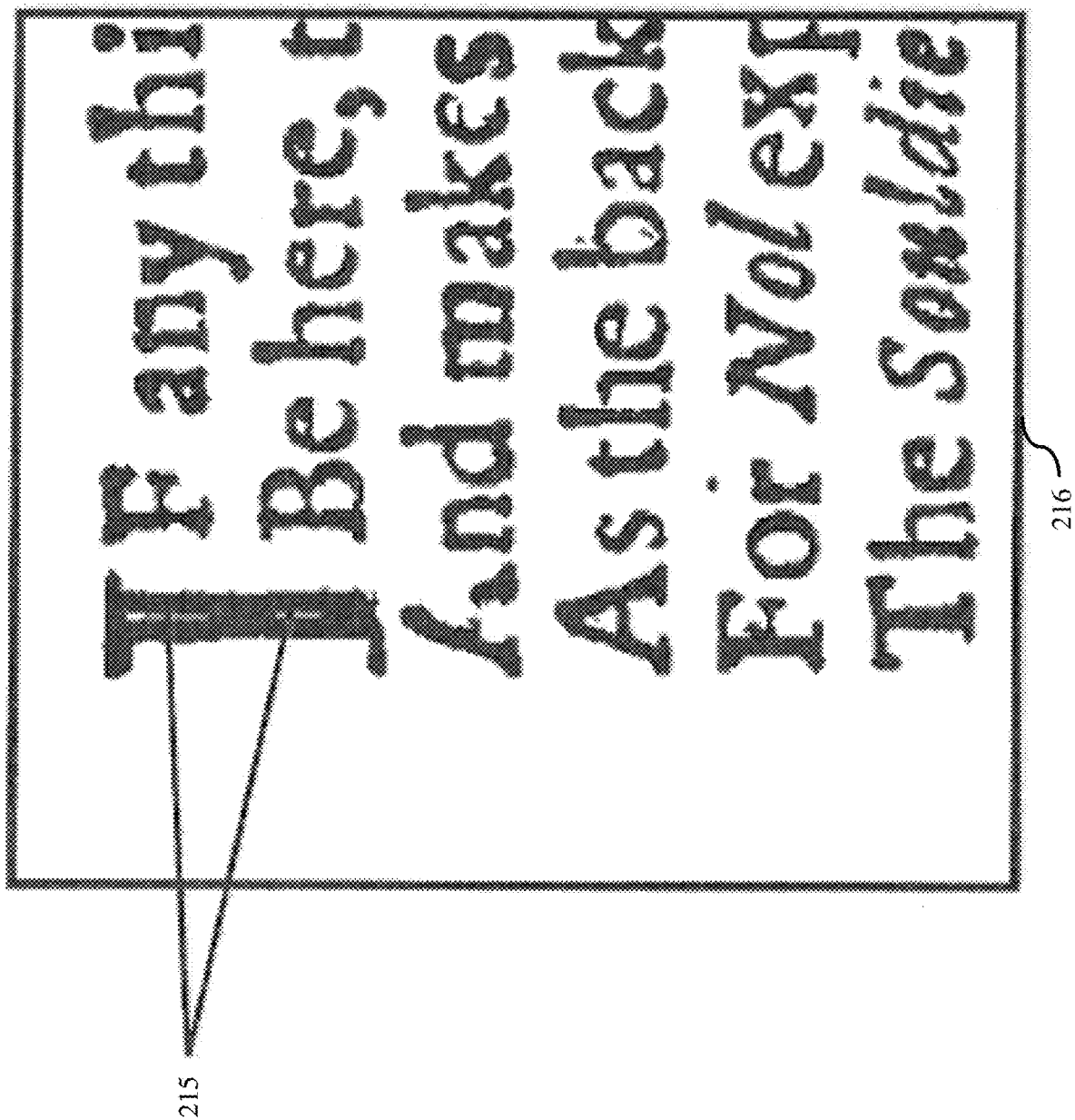
FIG. 6 shows a plateau and its surrounding boarder.

Returning to FIG. 1A, at block 34 the system is configured to compute an intersection between the edge detected image output 212 and the locally dark/light image output 214 and outputting a combined image 216. As shown at FIG. 5, in one embodiment, this is achieved by combining the image with the isolated edge detected output 212 (as described herein with respect to block 21 of FIG. 1A and FIGS. 1B-1C) with the pixels segregated into light pixels and dark pixels as output 214 (as shown at block 33 of FIG. 1A and FIG. 1D). FIG. 6 shows a magnified view of portions of the image inputs of the segregated image 212 and the image 214 and the resulting enhanced image output 216. The resulting enhanced image 216 cross-references the locally dark pixels segregated in image 214 and the script that is proximate to an edge from the clustered image 212. Only pixels that meet both criteria are shown in black in the enhanced image 216, and the rest of the image is white, resulting in a crisp, highly legible image.

Figure 1E:
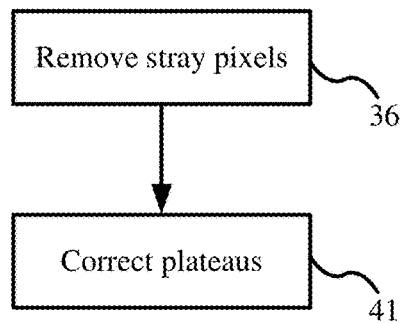

Returning again to FIG. 1A, at block 35 the system is configured to clean the combined image 216. As shown at FIG. 1E, the cleaning comprises removing stray pixels 36; and correcting plateaus 41.

Figure 1F:
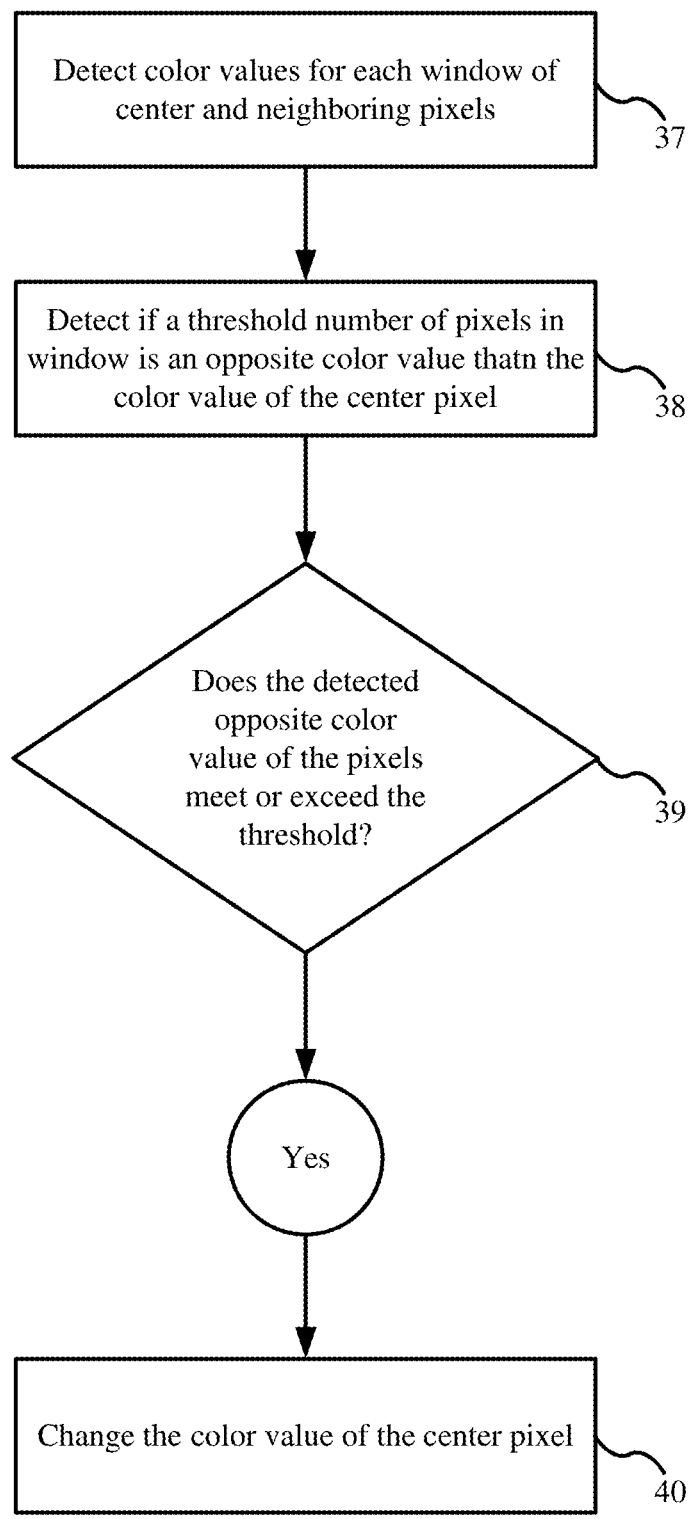

As shown in the embodiment described at FIG. 1F, the removal of stray pixels from the black and white image comprises, for each window of pixels: counting the number of black pixels within the window; counting the number of white pixels within the window; detecting if a threshold number of pixels within the window are the opposite color of the home pixel; and if so, changing the color value of the home pixel to the opposite color value for each center or home pixel of a window. In accord with the description herein, a window size can take on the values of 3, 5, 7, 9, and so on. Each pixel is identified as a "home" pixel for an area including a plurality of pixels. In the embodiment described below, the exemplary number of pixels in the window is at least 9 (a window size of 3), however the pixel window can have any odd number of pixels depending on the size of the window around a home or center pixel.

In an embodiment with a window size of at least 3, the removal of stray pixels comprises detecting color values of the home pixel (1) and a number (at least 8) of nearest surrounding pixels (together equaling at least 9 pixels) 37; and detecting if a threshold number of pixels is an opposite color value than the color value of the home pixel 38 by counting the number of black pixels within the window and counting the number of white pixels within the window. If the detected opposite color values of the pixels meets or exceeds the threshold number 39, the system if configured to change color value of the center pixel to the opposite color value 40, As will be appreciated, as the combined image 216 has only binary colors of black and white (dark and light) pixels, the color value is in every case one or the other, that is, black or white.

In an embodiment where a home pixel and its nearest surrounding neighbors are be a count of 9 pixels, that is, the center or home pixel b and the eight (8) neighboring pixels that surround it on all sides (a window size of 3), the color value threshold is at least 7 pixels as lower thresholds, while possible, can result in more degraded image results. This is because a window size of 3 having 9 pixels is arranged 3×3 in a grid-like arrangement in the square window, in which case a simple majority of 6 same-color values can leave the 3 opposite color pixels occupying the same row of pixels or one column of pixels, as shown in Table 1. Thus, by setting the threshold to require at least 7 pixels, the risk of degradation due is reduced. For example, in a window of 9 pixels (window size 3) with a color value threshold of 7, if there are 7-8 black pixels, the center pixel h is changed to black if the center or home pixel were previously white, as shown in Table 2 Contra, if 7-8 of the pixels are white, then the center pixel b is changed to white if the center or home pixel b were previously black. If, on the other hand, the color threshold is not met (i.e., 6 pixels or under are an opposite color) then the center pixel is left unchanged, as shown in Table 3.

| Black | White | Black |
| Black | White | Black |
| Black | White | Black |

Table 1, showing a simple majority (6) of Black pixels leaves a row of same colored White pixels, including the center pixel, that are not in the majority.

| Black | Black | Black |
| Black | White to Black | Black |
| Black | White | Black |

Table 2, showing an example where for a threshold of 7, the system is configured to change the center White pixel to a Black pixel where there are at least 7 Black pixels in the window.

| Black | White | White |
| Black | White (no change) | White |
| Black | White | White |

Table 3, showing an example where for a threshold of 7, the system is configured to not to change a center White pixel where there are at least 6 White pixels in the window.

As will be appreciated, if the window grows to encompass more than the minimum 8 pixels of pixels around the home pixel than the threshold will also grow beyond the value of 7 or greater. As noted above, while a simple majority can be employed, a threshold should be configured such that every row and column of the pixels includes at least one pixel having the same black or white color-value as the majority number of pixels in the square. That is to say, system should be configured such that no row or column can have all the same black or white colored pixel values if those black or white color values are in the minority. For example for a window size of 5 encompassing a grid of 25 pixels or a window size of 7 encompassing a grid of 49 pixels, the threshold can be configured to be at thresholds of at least: 21 and 43 pixels respectively. Hence for every window size n, having a grid of a*n pixels, the threshold can be at least (n*n−1)+1 pixels.

Figure 1G:
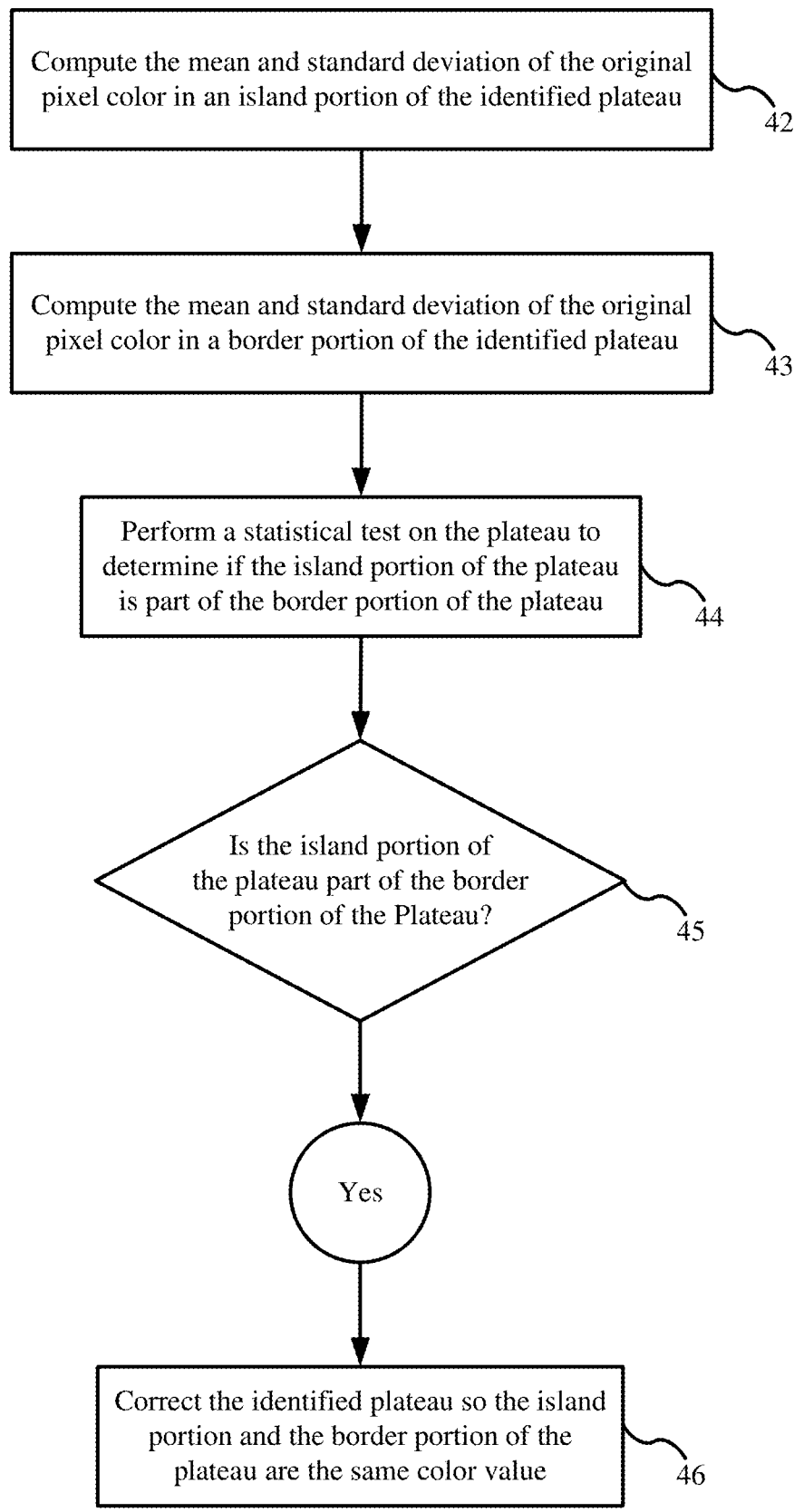
Figure 2:
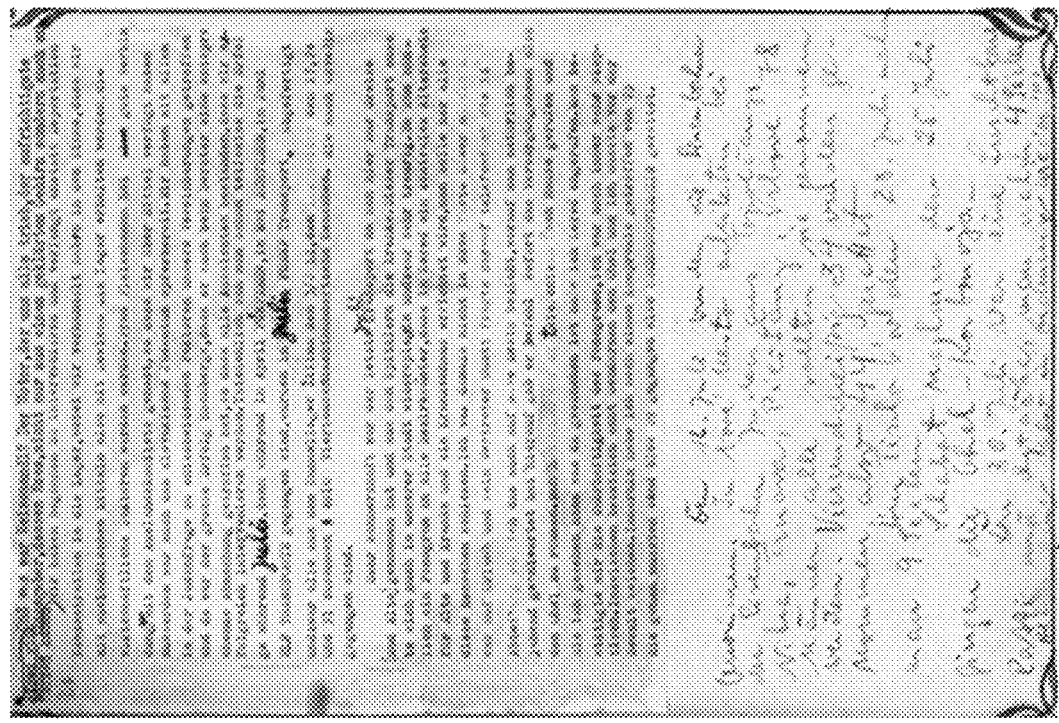
FIG. 2 shows an example of an original color image and a corresponding converted grayscale image.
Figure 2:
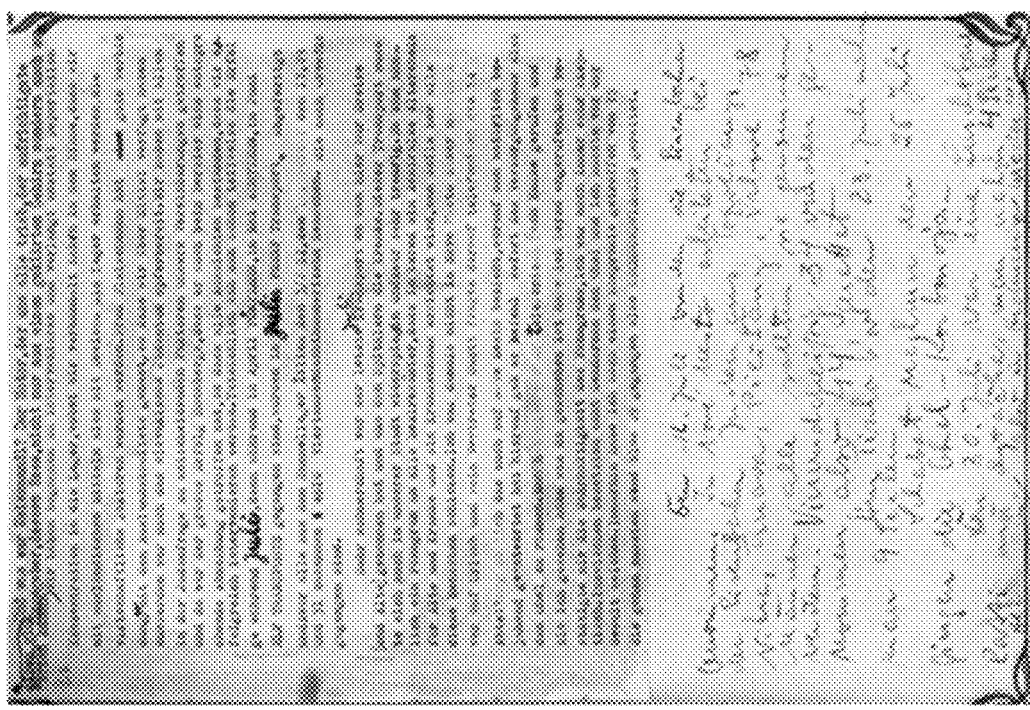

As shown in the embodiment described at FIG. 1G, the correction of plateaus comprises, for the identified plateaus:

computing the mean and standard deviation of the original pixel color in an island portion of the identified plateau 42;

computing the mean and standard deviation, of the original pixel color m a border portion of the identified plateau 43;

performing a statistical test, for example a two-sample z-test or other statistical tests as known in the art, on the plateau to determine if the island portion of the plateau is part of the border portion of the plateau 44; and if the island portion of the plateau is a part of the border portion of the plateau 45, correcting the identified plateau so the island portion and the border portion of the plateau are the same color value 46.

As shown at FIG. 6, a combined image 216 may have "island" portions inside script that are opposite the black or white color value of the border script 215, which are identified as plateaus. Plateaus can be the result of, for example, large fonts in a given image. In such an instance, as shown in FIG. 1F, when, a font is large the center of a letter may not be "near an edge," thus the processing can leave the island 215. Accordingly, in an embodiment the system is configured to determine if an island of a plateau is anomalous and if so, correct it, or determine if the island is in fact a correct representations of the original image 200. At block 42, the mean and standard deviation of the pixel color of the original pixel color from the original grayscale image 202 is computed. At block 43 a mean and standard deviation of the original pixel color of the border portion of the identified plateau is computed. At block 44, a two-sample z-test (a statistical operation) is performed on the plateau using the computed standard deviations from the original grayscale image 202 to determine if the island portion of the plateau is part of the border portion of the plateau. At block 45 if the island portion of the plateau is determined to be a part of the border portion of the plateau 45, the identified plateau is corrected so the island portion and the border portion of the plateau are the same color value 46.

Figure 7A:
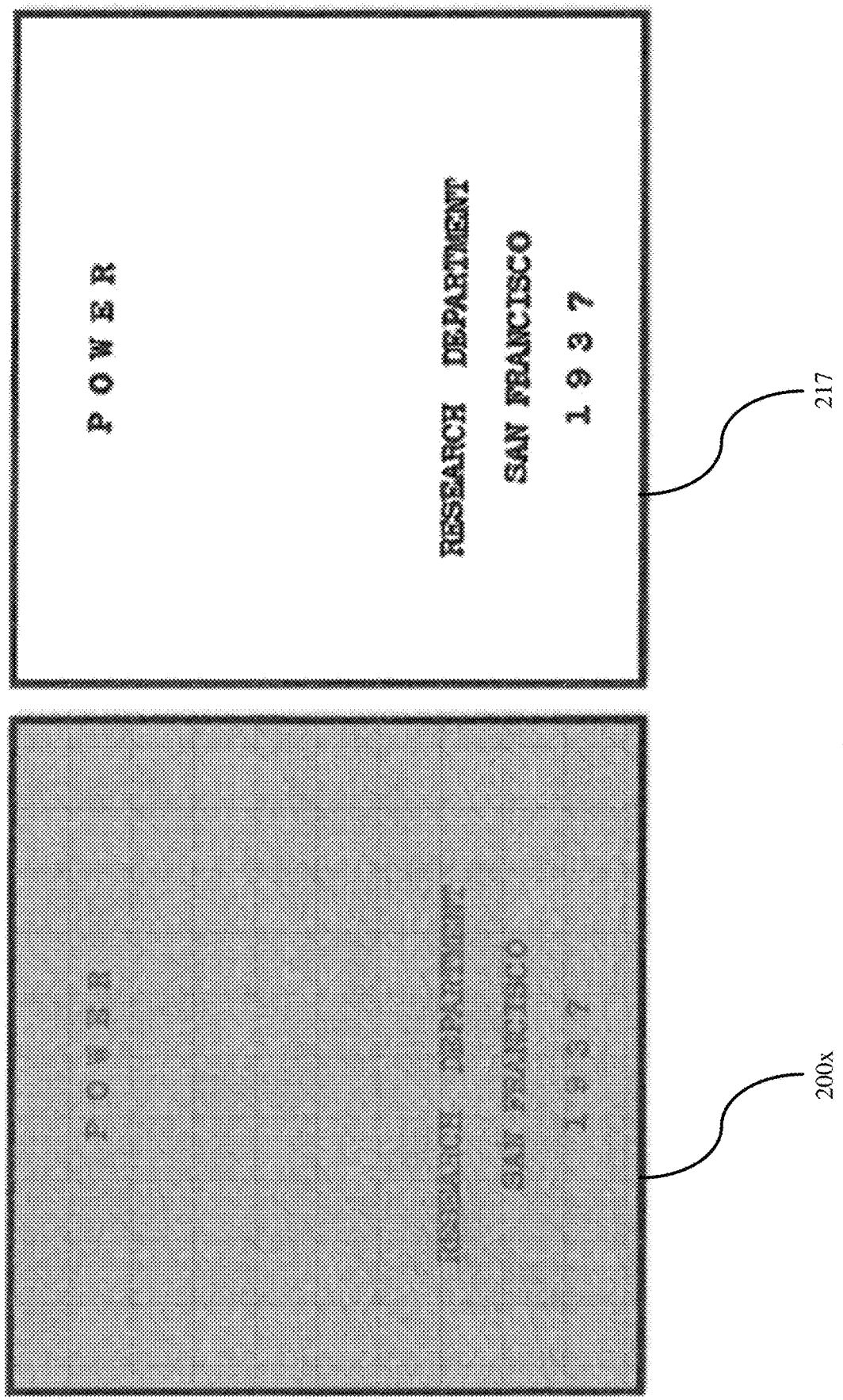
FIGS. 7A-7B show comparisons of an original image and processed enhanced images with a manually created goal solution image.
Figure 7B:
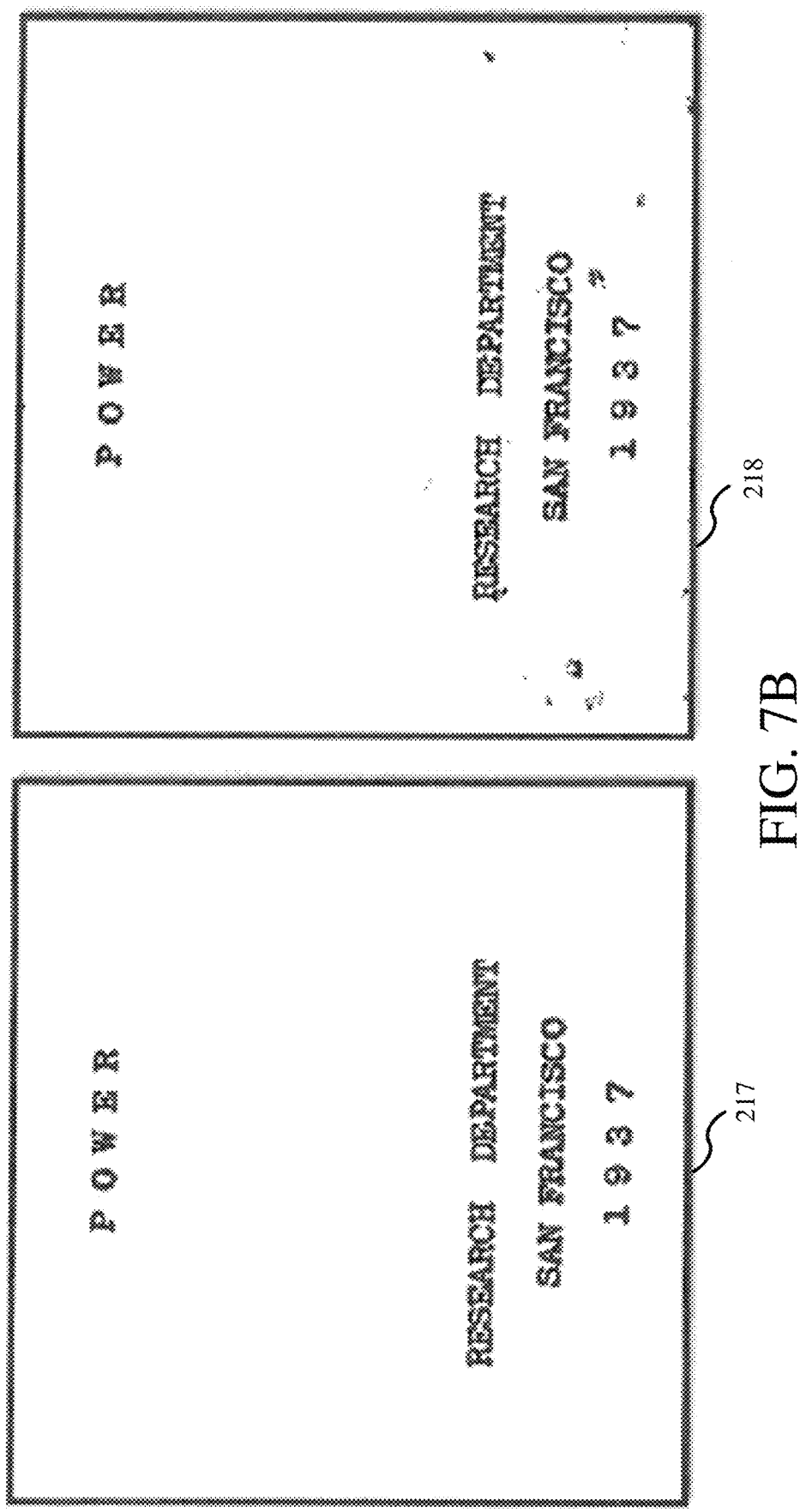

The system and method described herein show exemplary novel advantages. For example, a test set of comparative images can be drawn from the Document Image Binarization Contest (DIBCO). Held in 2009 and 2011 at the International Conference on Document Analysis and Recognition (ICDAR), the contest provided "difficult case" input images to be processed for legibility. A particularly difficult original image 200x is shown at FIG. 7A, in which the original image 200x is highly texturized, a dark brown background, and has faded script. The imaged texture makes it very difficult for image processing systems to achieve correct binarization results that can distinguish, and make legible script from the texturized and colored background. FIG. 7A also shows an exemplary, manually produced "goal solution" 217 provided by DIBCO against which systems for binarizing images for legibility were to have image results judged. As shown in FIG. 7B the manually produced exemplary "goal solution" 217 provided by the latest DIBCO is placed side-by-side with an image result 218 for the original document 200x processed by the present system and method. The side-by-side for comparison shows the image result 218 nigh mirrors the target solution 217.

TABLE 4

|  | $1^{st}$ Place | $2^{nd}$ Place | $3^{rd}$ Place | Described image processing |
|---|---|---|---|---|
| Mean F1 | 80.9 | 85.2 | 88.7 | 88.9 |
| Median F1 | 92.3 | 92.1 | 90.6 | 89.7 |
| Variance F1 | 794 | 302 | 49.7 | 19.2 |

Table 4 presents a comparison of documents processed by the $1^{st}$, $2^{nd}$ and $3^{rd}$ place winners of the latest DIBCO competition as compared to the same documents processed using an embodiment of the system and method as described herein. DIBCO competitions score document results via the following criteria: (1) Recall, which measured the percentage of truly black pixels that were predicted to be black and (2) Precision, which measures the percentage of predicted black pixels that, are truly black. An F1 Measure is the primary measure for judging, which measures in accord with the equation:

$$F1=2(\text{Precision}\cdot\text{Recall})/(\text{Precision}+\text{Recall})$$

As will be appreciated, higher Mean F1 values and higher Median F1 values represent better images. As shown in Table 1, the present system processed documents as well as or better than the winning systems with, respect to Mean and Median F1 scores. However with a variably F1 of 19.2, the present system did so with significantly less variability, at an order of magnitude less than the 1st and $2^{nd}$ place winners (792 and 304) and significantly less than the 3rd place winner (49.7). This means the present system produced images of high legibility at equivalent quality of the winners of the competition, and did so while processing documents with greater consistency, and hence, far fewer failures. In contrast, while latest DIBCO competition awards points for each test image, $1^{st}$ and $2^{nd}$ place frequently do very well but sometime fail outright (hence their mean performance is significantly lower than their median performance).

Figure 8A:
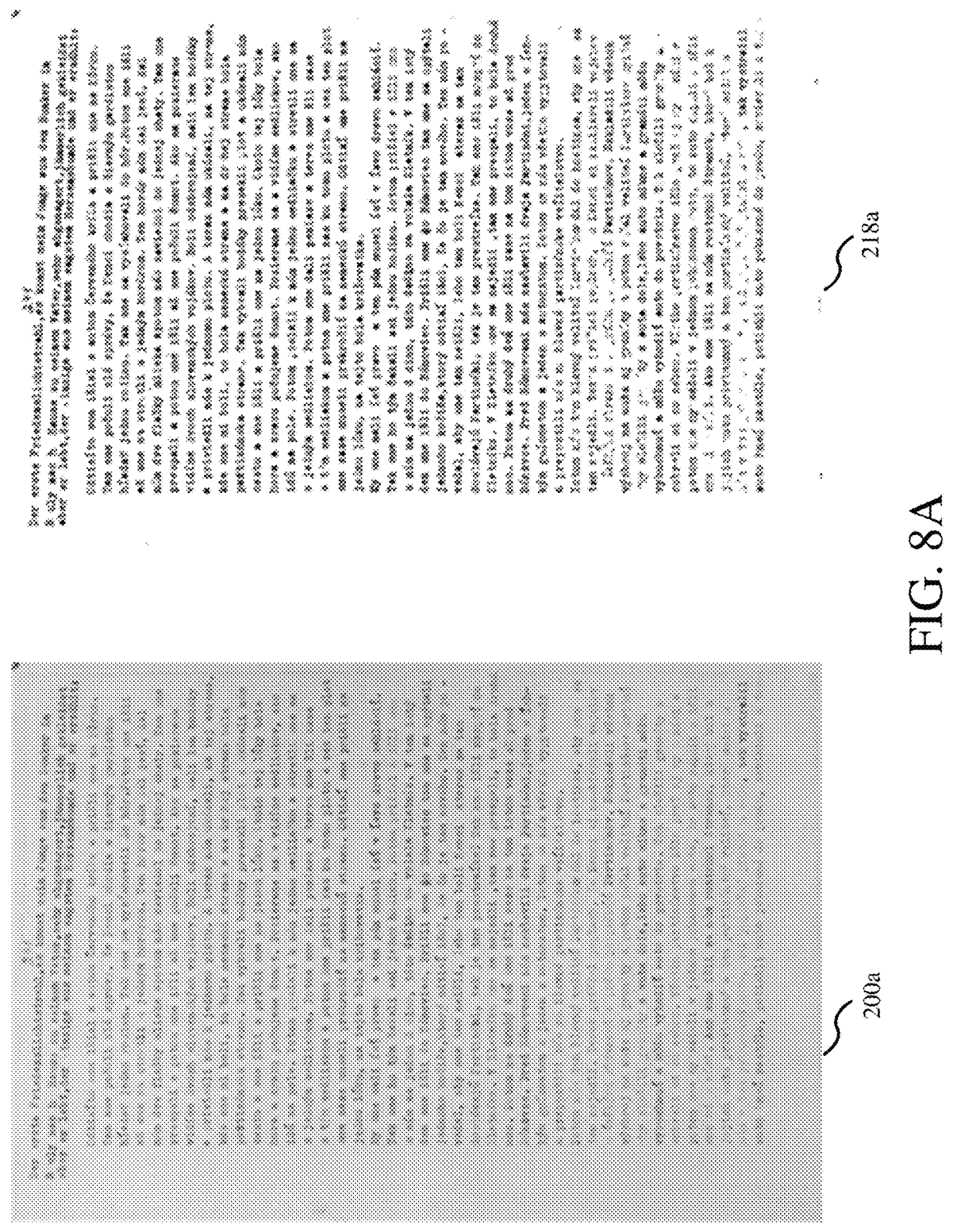
Figure 8B:
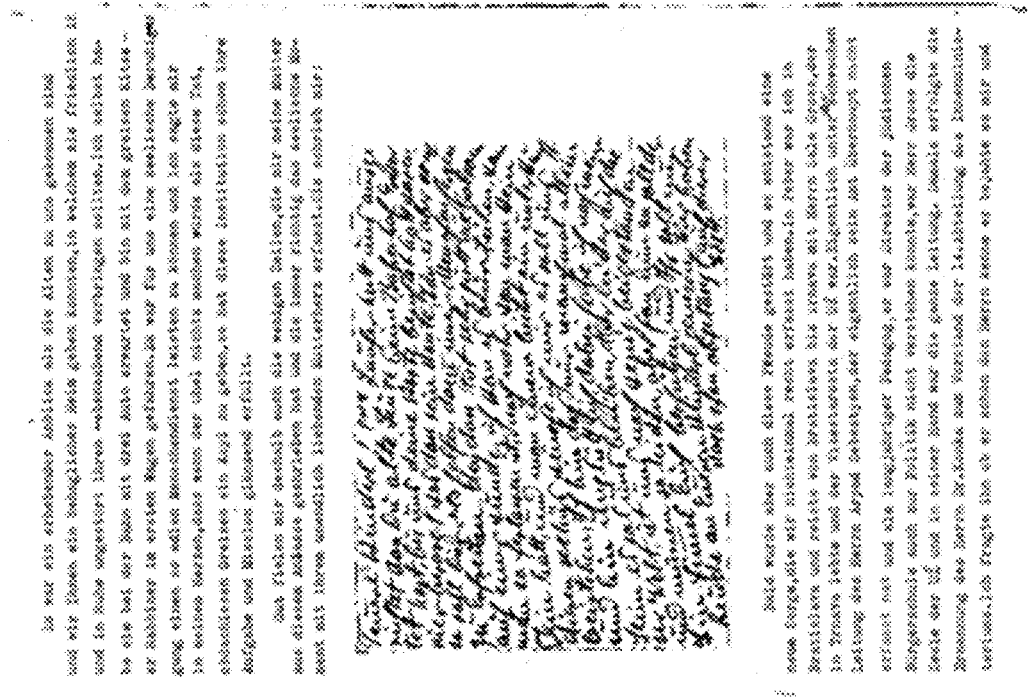
Figure 8B:
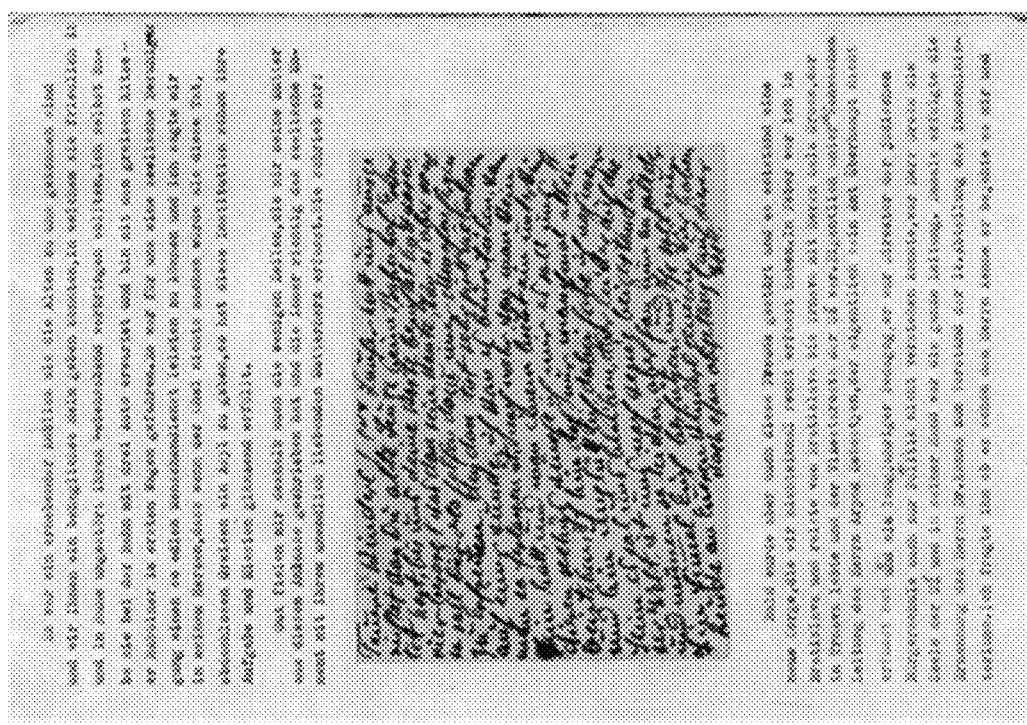
Figure 8C:
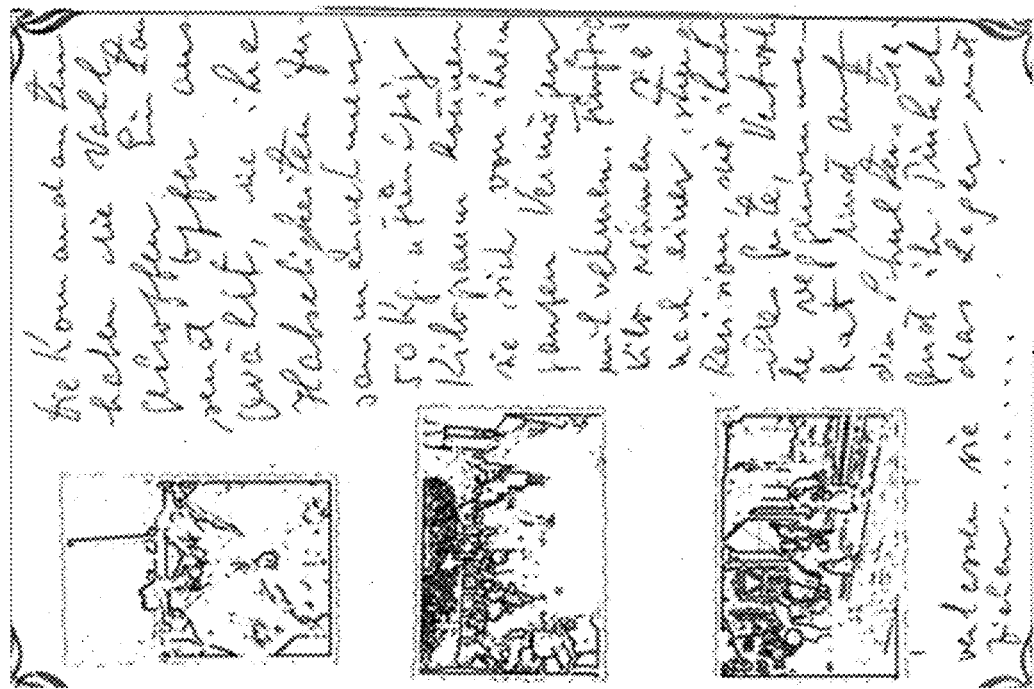
Figure 8C:
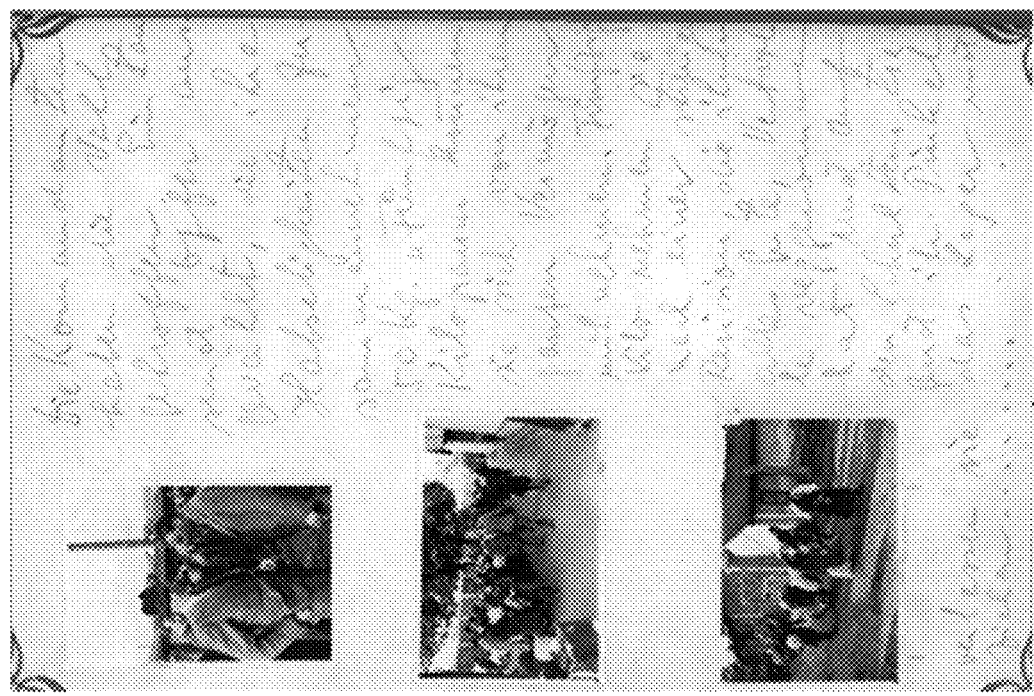
Figure 8D:
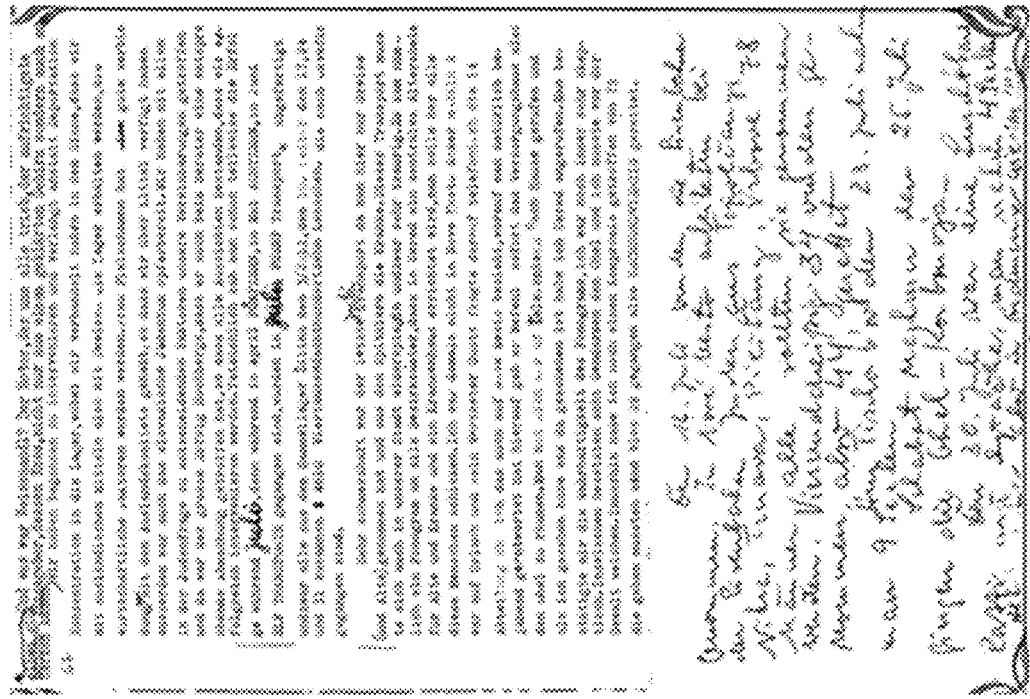
Figure 8D:
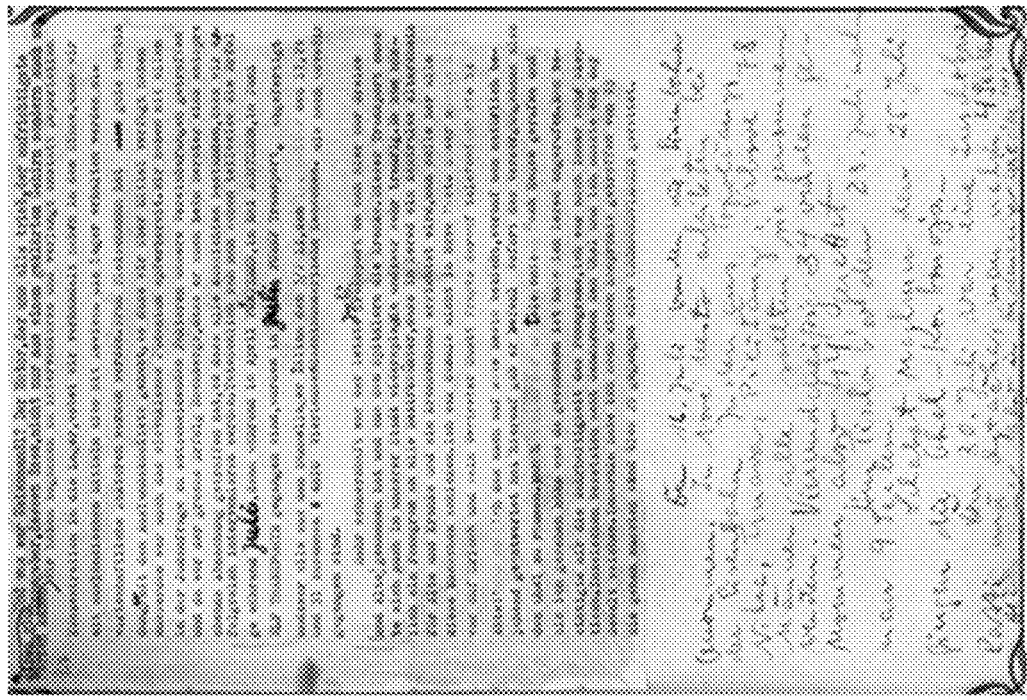

As shown at FIGS. 8A-8D, another dataset shows original images 200a-200d compared against final enhanced images 218a-218d. A dataset of processed images is a collection of World War II era document images, the originals residing at the Yad Vashem Holocaust Memorial in Israel. FIGS. 8A-8D are further examples of original images 200a-200d and enhanced images 218a-218d, which show that a wide variety of script and symbols can be enhanced and made more legible, readable, and clear. For instance, FIGS. 8C and 8D show original historical documents 200c, 200d with highly degraded script which is handwritten. The output enhanced images 218c and 218d show highly readable and legible document images. As will be noted, degraded script that was faded or obscured in the original image is clearly legible enhanced script, and the enhanced script is even and consistent with the script of the whole image in the enhanced image 218c, 218d. FIGS. 8B and 8D show original images 200b, 200d and enhanced images 218b, 218d having both handwriting and typeset in the same image, and in FIG. 8D, the typeset has handwritten edits. As shown in FIG. 8C, the original image 200c and enhanced image 218c includes photos; the presence of the photos does nothing to impede the script enhancement, although the photo is treated by it. Thus in one embodiment the system could be configured to identify photos either before or after the script enhancement method for the purpose of reincorporating the original image or grayscale image back into the enhanced image (not shown).

Figure 9:
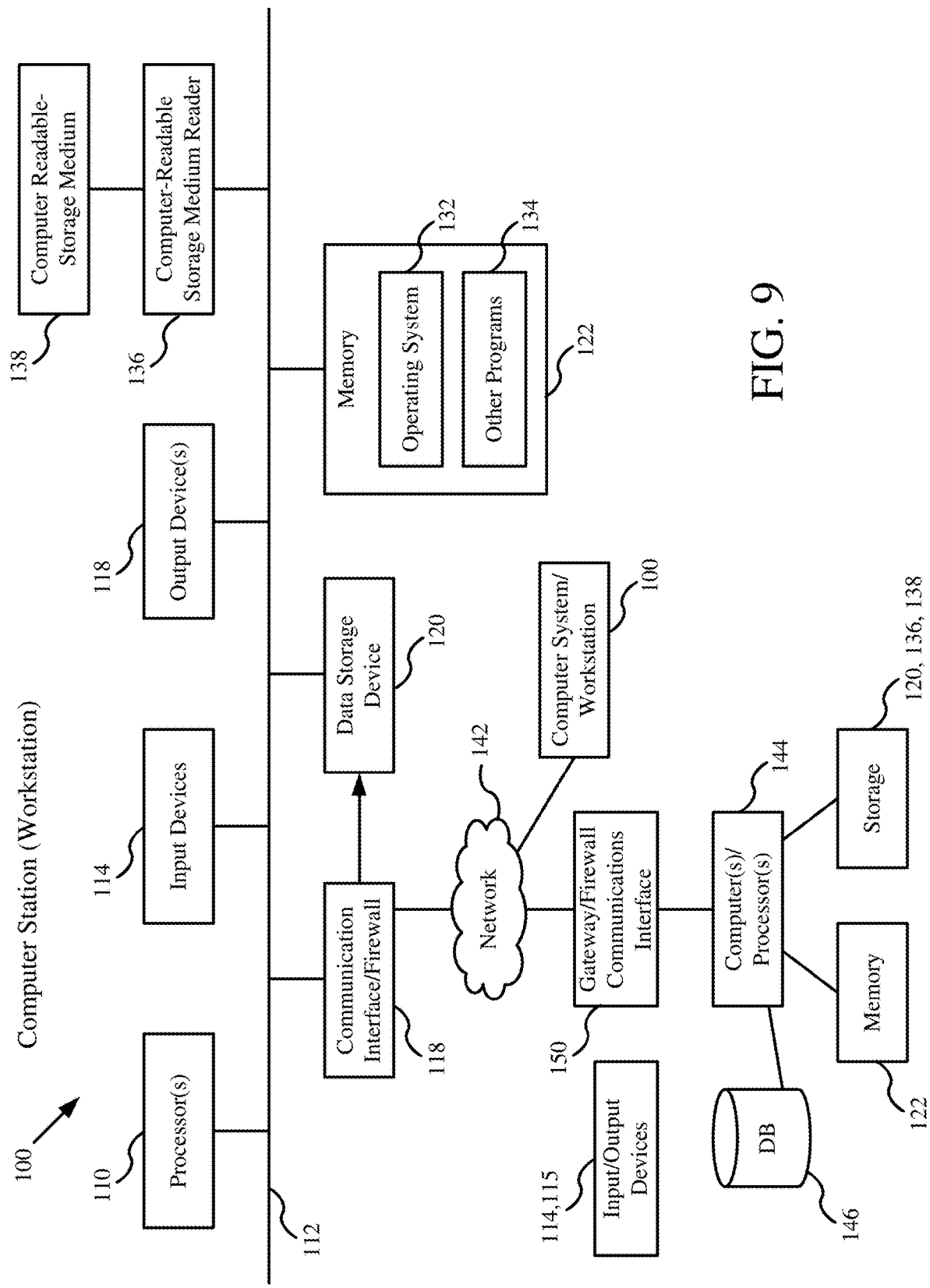
FIG. 9 shows an exemplary computer system and architecture for carrying out the method for image enhancement.

Embodiments may be implemented by systems using one or more programmable digital computers and computer readable storage media. In one embodiment, FIG. 9 depicts an example of one such computer system 100, which includes at least one processor 110, such as, e.g., an Intel or Advanced Micro Devices microprocessor, coupled to a communications channel or bus 112. The computer system 100 further includes at least one input device 114 such as, e.g., a keyboard, mouse, touch pad or screen, or other selection or pointing device, at least one output device 116 such as, e.g., an electronic display device, at least one communications interface 118, at least one computer readable medium or data storage device 120 such as a magnetic disk or an optical disk and memory 122 such as Random-Access Memory (RAM), each coupled to the communications channel 112. The communications interface 118 may be coupled to a network 142.

One skilled in the art will recognize that many variations of the system 100 are possible, e.g., the system 100 may include multiple channels or buses 112, various arrangements of storage devices 120 and memory 122, as different units or combined units, one or more, computer-readable storage medium (CRSM) readers 136, such as, e.g., a magnetic disk drive, magneto-optical drive, optical disk drive, or flash drive, multiple components of a given type, e.g., processors 110, input devices 114, communications interfaces 118, etc.

In one or more embodiments, computer system 100 communicates over the network 142 with at least one computer 144, which may comprise one or more host computers and/or server computers and/or one or more other computers, e.g. computer system 100, performing host and/or server functions including web server and/or application server functions. In one or more embodiments, a database 146 is accessed by the at least one computer 144. The at least one computer 144 may include components as described for computer system 100, and other components as is well known in the computer arts. Network 142 may comprise one or more LANS, WANS, intranets, the Internet, and other networks known in the art. In one or more embodiments, computer system 100 is configured as a workstation that communicates with the at least one computer 144 over the network 142. In one or more embodiments, computer system 100 is configured as a client in a client-server system in which the at least one other computer comprises one or more servers. Additional computer systems 100, any of which may be configured as a work station and/or client computer, may communicate with the at least one computer 144 and/or another computer system 100 over the network 142.

For example, one or more databases 146 may store the scanned image data as described herein. In various embodiments, the processing disclosed herein may be performed by computer(s)/processor(s) 144 in a host arrangement with computer system 100, or in a distributed arrangement in computer system 100 and computer(s)/processor(s) 144, or by computer system 100 in cooperation with data stored in database 146. Computer(s)/Processor(s) 144 may perform the processing disclosed herein, based on computer code stored in a storage device or device(s) 120, 136, 138 and/or memory 122.

Figure 10:
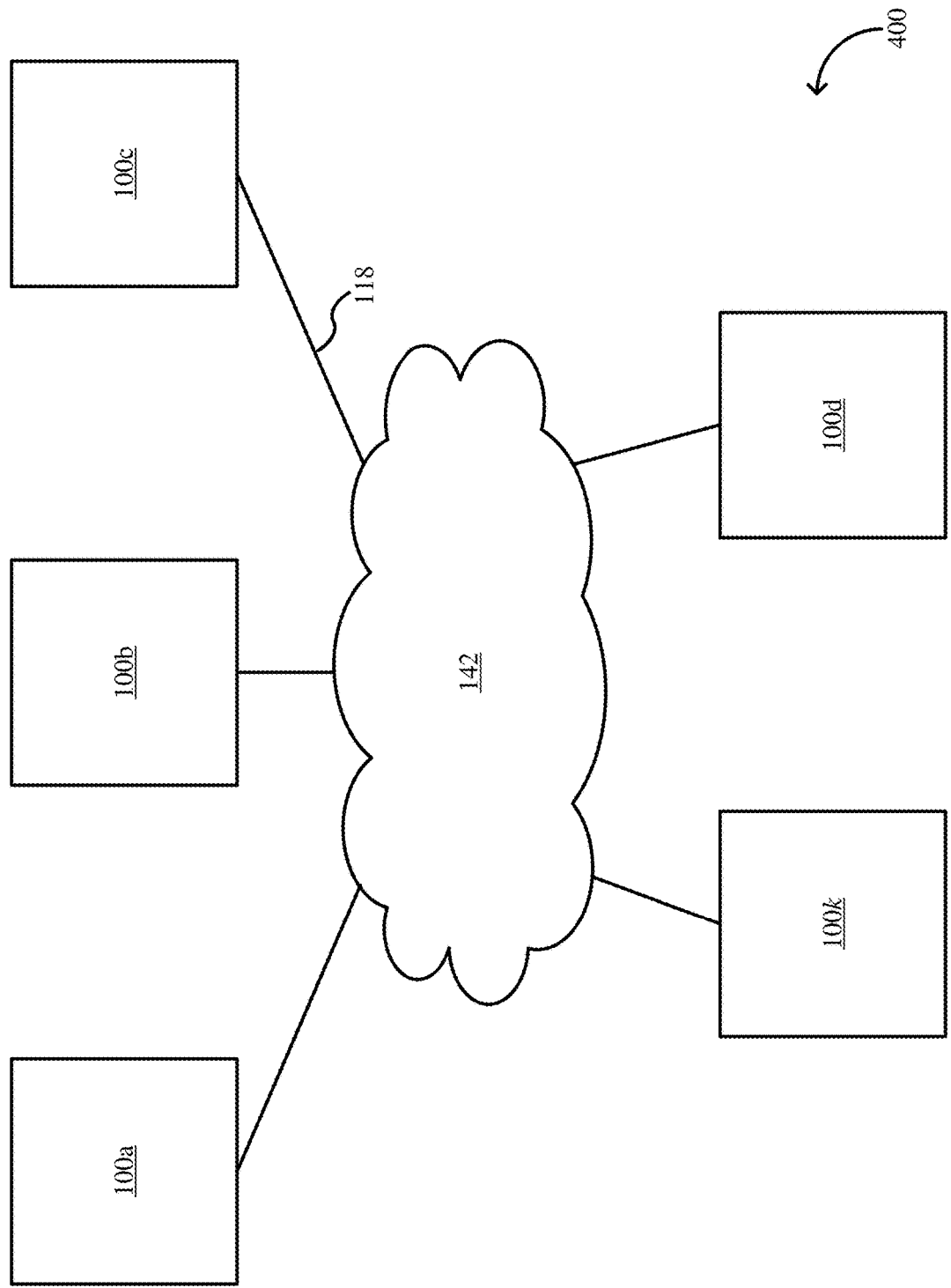
FIG. 10 shows an exemplary network environment for carrying out the method for image enhancement.

FIG. 10 shows an exemplary network environment 400 adapted to support embodiments as disclosed herein, as for example for data parallel processing of images. The exemplary environment 400 includes a network 142, and a plurality of computers 100, or computer systems 100(a) . . . (k) (where "k" is any suitable number). Computers could include, for example one or more SQL servers. Computers 100 can also include wired and wireless systems as described herein. Data storage, processing, data transfer, and program, operation can occur by the inter-operation of the components of network environment 400. For example, a component including a program in server 100(a) can be adapted and arranged to respond to data stored in server 100(b) and data input from server 100(c). This response may occur as a result of preprogrammed instructions and can occur without intervention of an operator. As described herein, in certain embodiments the automated method is configured to process images individually on an image-by-image basis, where each image is a "page" of a document in an image database. Accordingly, the system can be configured for data parallel processing of images and pages. Pages or images from a given document or set of documents can be partitioned and distributed among the computer systems 100(a) . . . (k) for parallel processing and the document or document set recombined after processing. Again, this response may occur as a result of preprogrammed instructions and can occur without intervention of an operator.

The network 142 is, for example, any combination of linked computers, or processing devices, adapted to access, transfer and/or process data. The network 142 may be private Internet Protocol (IP) networks, as well as public IP networks, such as the Internet that can utilize World Wide Web (www) browsing functionality, or a combination of private networks and public networks of any type.

A computer 100(a) for the system can be adapted to access data, transmit data to, and receive data from, other computers 100(b) . . . (k), via the network or network 142. The computers 100 typically utilize a network service provider, such as an Internet Service Provider (ISP) or Application Service Provider (ASP) (ISP and ASP are not shown) to access resources of the network 142.

The computers 100 may be operatively connected to a network 142, via bi-directional communication channel, or inter connector, 118, which may be for example a serial bus such as IEEE 1394, or other wire or wireless transmission media. Examples of wireless transmission media include transmission between a modem (not shown), such as a cellular modem, utilizing a wireless communication protocol, or wireless service provider or a device utilizing a wireless application protocol and a wireless transceiver (not shown). The interconnector 118 may be used to feed, or provide data.

Figure 11:
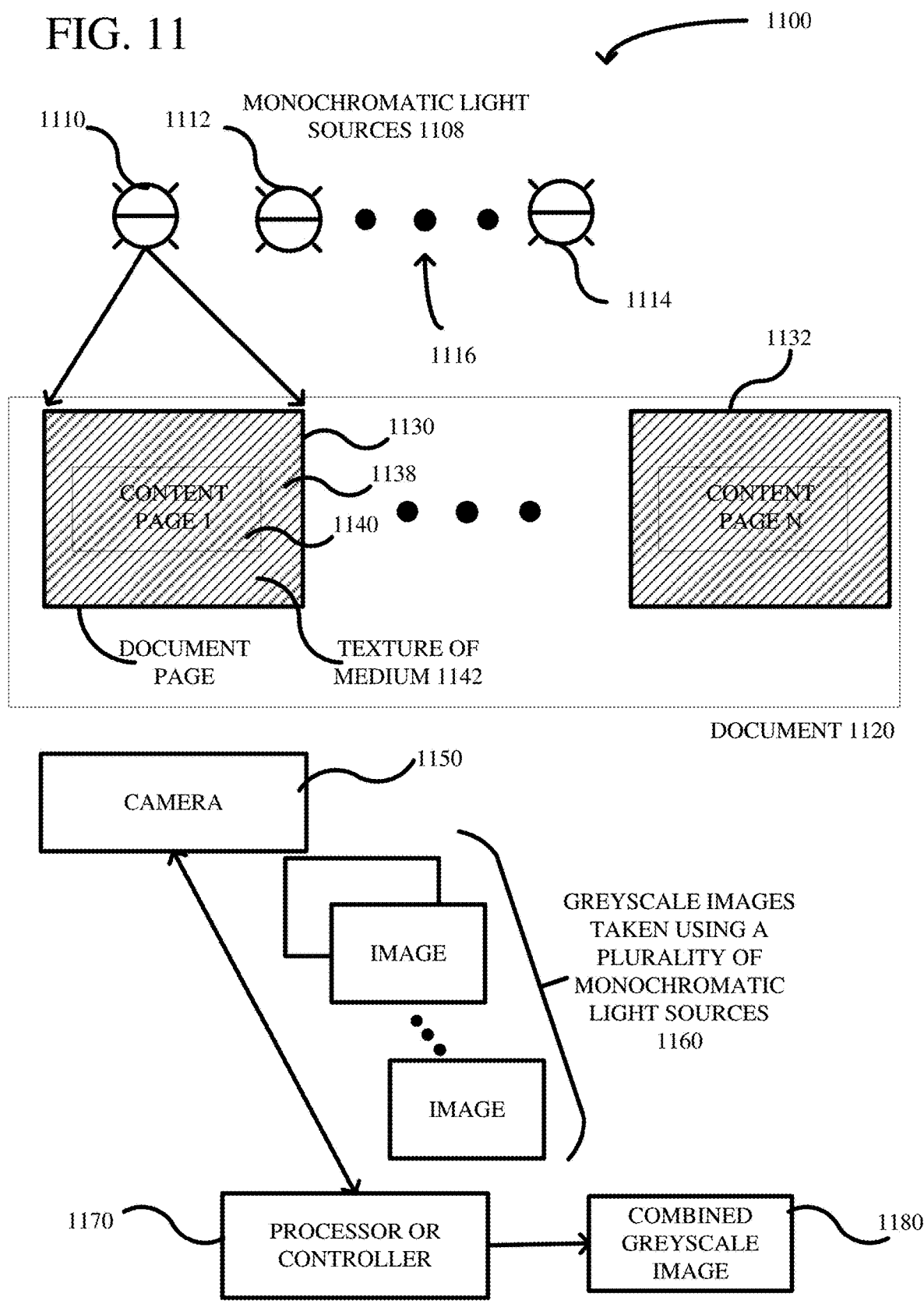
FIG. 11 includes a system diagram showing multiple monochromatic light sources used to capture a plurality of greyscale images.

FIG. 11 is a system diagram 1100 including multiple monochromatic light sources 1108, such as light sources 1110, 1112, 1114 producing light at different wavelengths. Any number of light sources can be used, as indicated by dots 1116. In one example, eight different light sources are used with each light source having differing wavelengths, as indicated in the following table:

| Image | Wavelength (nm) | Type |
| --- | --- | --- |
| F1.png | 340 | UV |
| F2.png | 500 | Visible 1 |
| F3.png | 600 | Visible 2 |
| F4.png | 700 | Visible 3 |
| F5.png | 800 | IR 1 |
| F6.png | 900 | IR2 |
| F7.png | 1000 | IR3 |
| F8.png | 1100 | IR4 |

As can be seen from the above table, the wavelengths can vary from approximately 300 nm to 1100 nm. Other wavelengths can be used depending on the implementation. The wavelengths can correspond to ultraviolet (UV) light, visible light, Infrared (IR) light, etc. Any of a variety of sequences of light sources can be used to illuminate a document 1120, one monochromatic light source at a time. The document can include multiple pages (N pages, where N is any integer number) as shown at 1130 through 1132. Each document page is made from any of a variety of mediums 1138 (shown in cross-hatching) including, but not limited to, paper, skin, parchment, film, cloth, leather, or plastic. Each document page includes content (letters, graphics, images, etc.), such as is shown at 1140, which is positioned on the medium 1138, such as by printing, writing, painting, etching, or other means. Additionally, each medium includes texture 1142, such as wrinkles or other distortions in the surface texture. The texture 1142 can also relate to a characteristic physical structure of the material, such as interwoven or intertwined threads, strands or the like that make up the visual and tactile quality of the surface of the page.

A camera 1150 is positioned to capture images of the document 1120 as the different monochromatic light sources 1108 illuminate the document page 1130, one monochromatic light source at a time. Typically, a first content page 1130 can be used as a test to determine an optimal group of the monochromatic light sources 1108 to be used as a subset. In one example, 8 images can be captured, as shown at 1160, using the different wavelengths identified above. Each image is a greyscale image as a result of using a single monochromatic light source. The images can be input to a processor or controller 1170 that can combine the images using any of a variety of techniques. In one example, a linear weighted combination of the images can be used to produce a combined greyscale image 1180.

A variety of equations can be used to implement the combination of images. In one example, a pixel-by-pixel combination can be performed using a generic formula:

$$F_{bestinput} = \sum_{i=1}^{n} c_i \cdot F_i$$

In this general equation each coefficient is bounded by: $-1 \leq c_i \leq 1$.

And the coefficients follow the rule:

$$1 = \sum_{i=1}^{n} c_i$$

The constant n refers to the total number of different spectral images of the same document that are available. More specific formulas derived from the aforementioned formulas include the following:

$$F_i - F_j$$

$$F_i + (F_j - F_k)$$

Where i, j, and k represent different wavelengths of monochromatic light and F represents an image taken at that wavelength. The combination typically includes subtracting off the background texture of an image leaving behind a cleaned image focused on the content. The image or multiple images that are subtracted off of the main image can be considered a correction term used to clean the main image, which is focused on content.

Figure 12:
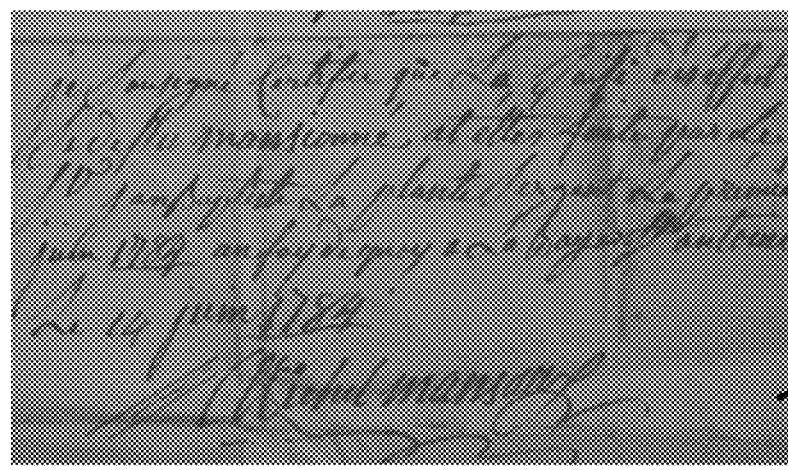
FIG. 12 is an example showing greyscale images captured using different wavelengths of monochromatic light.
Figure 12:
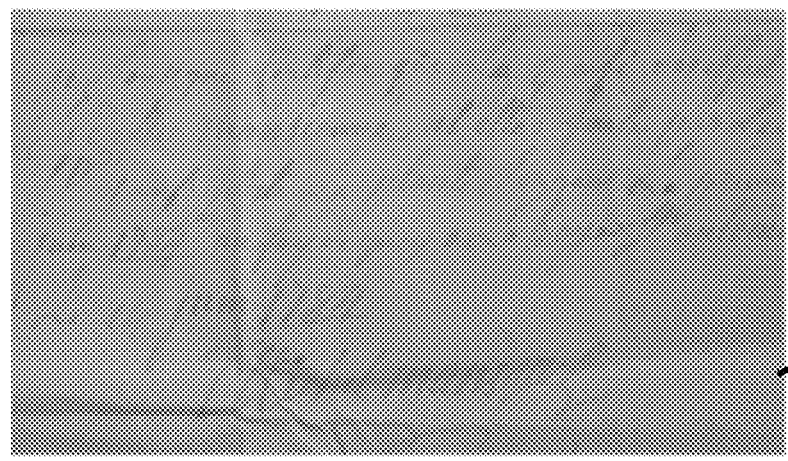
Figure 12:
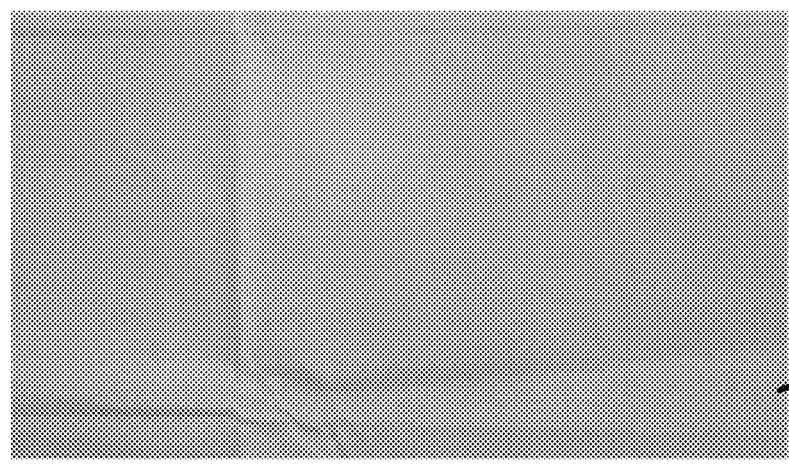

FIG. 12 shows an example of 3 images. In a first image 1210, content is captured using a monochromatic light source having a wavelength of 500 nm. In this example, the medium is paper and the content is written words formed using ink. A second image 1220 is captured using a monochromatic light source having a wavelength of 800 nm. In this example, the texture of the paper is more visible and the content is lighter and less clear. A third image 1230 is taken using a light source having a wavelength of 1100 nm. In this example, the content is not visible and the texture of the paper (including folds and wrinkles) is more pronounced. A combination of images 1220 and 1230 can be used as a texture component and that combination can be subtracted from the content image 1210. The resultant greyscale image can then be used as input into an image enhancement algorithm. Any desired image enhancement algorithm can be used, including the algorithm described above.

The three images of FIG. 12 can be chosen from a plurality of sample images taken using other wavelengths of monochromatic light. However, through an automated or manual process, only a subset of the images are chosen as those that best reflect the content and the texture of the document. Such a subset can be chosen manually or through an automated process. However, once chosen, the corresponding wavelengths of monochromatic light for the subset can be used for all pages of the document, should the document include more than 1 page.

Figure 13:
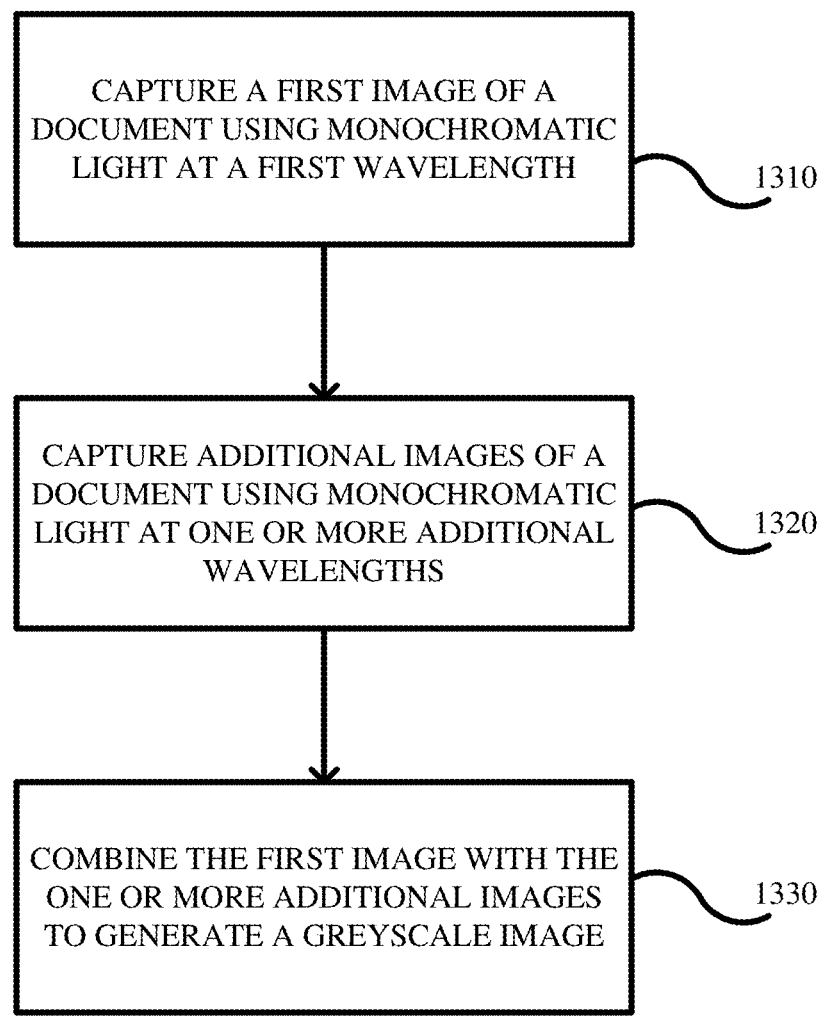
FIG. 13 is a flowchart of a method according to one embodiment for generating a greyscale image.

FIG. 13 is a flowchart of a method for enhancing imaging of a document. In process block 1310, a first image is captured of a document using monochromatic light at a first wavelength. Any of a variety of wavelengths can be used including, but not limited to, wavelengths in the infrared, visible, or ultraviolet spectrums. The capturing of the image can include illuminating the image using the monochromatic light and capturing the image (digitizing the image) using a camera. The wavelength chosen for capturing the image is typically, but not limited to, one that best shows the content associated with the document and is independent of the document texture. In process block 1320, additional images can be captured using monochromatic light sources at one or more additional wavelengths, different than the first wavelength. The monochromatic light sources can be chosen to optimize visualization of the document texture and is typically, but not limited to being, independent of the document content. For example, the monochromatic light sources can be chosen that show wrinkles or other surface features of the document medium. In process block 1330, the first image, which is a greyscale image, can be combined with one or more additional images, which are also greyscale images, to generate a final greyscale image that can be used in the imaging enhancement algorithm described above, or other algorithms known in the art. The combining of the images can be accomplished using any of the above-described formulas so as to implement a linear weighted combination of the images. In one example combination, corresponding pixels between images are subtracted so that the texture is subtracted from the image containing the content. In other examples, a combination of images can be added to obtain an approximation of the texture of the document. That combination can then be added to the main image of the content.

Figure 14:
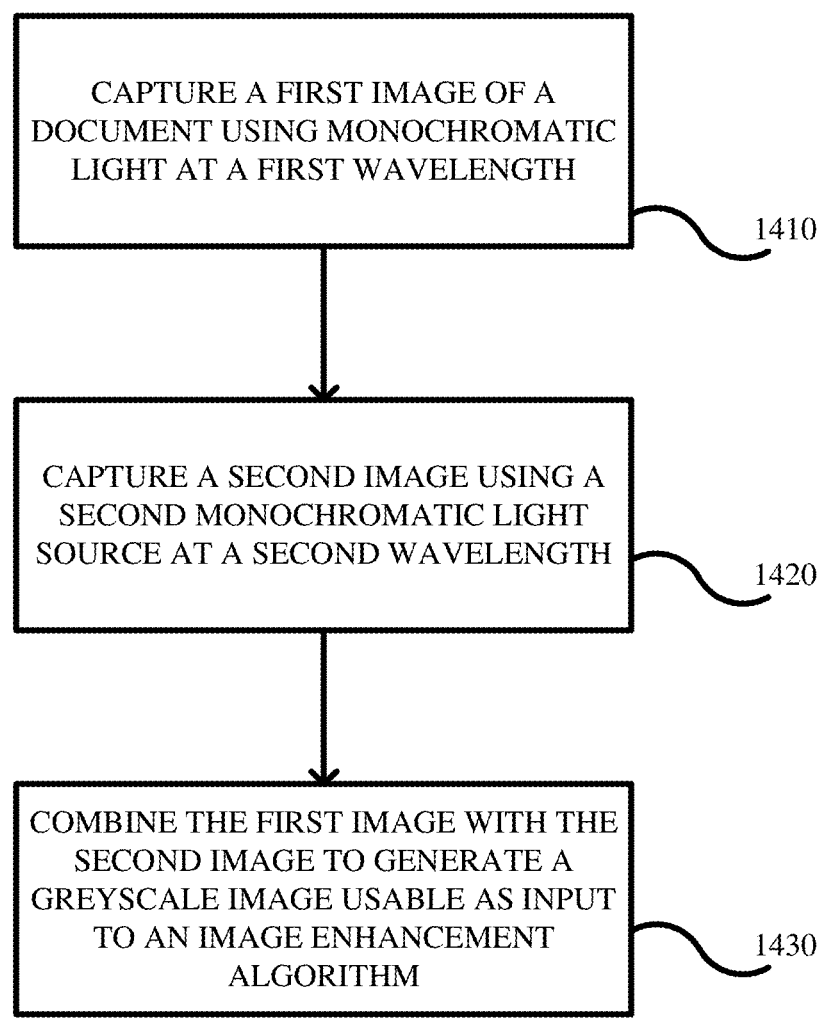
FIG. 14 is a flowchart of a method according to another embodiment for generating a greyscale image.

FIG. 14 shows a flowchart of a method according to another embodiment. In process block 1410, a first image is captured using monochromatic light at a first wavelength. Any of a variety of monochromatic light sources can be used to generate the monochromatic light. Through testing, a determination can be made which light source is best for enhancing the visualization of the content. In process block 1420, a second image can be captured using a second monochromatic light source at a second wavelength. The second monochromatic light source can be one that is optimized for visualization of a texture of the document. In process block 1430, the first image is combined with the second image to generate a greyscale image usable as input to an image enhancement algorithm. Any desired enhancement algorithms can be used including those described herein, such as the algorithm shown in FIG. 1A. The combining in process block 1430 can be accomplished using a variety of techniques. For example, the second image can be subtracted from the first image so as to subtract the texture of the second image from the content of the first image. Such subtraction can be performed on a pixel-by-pixel basis. Further, normalizing the pixel values can be used to implement the combination.

Figure 15:
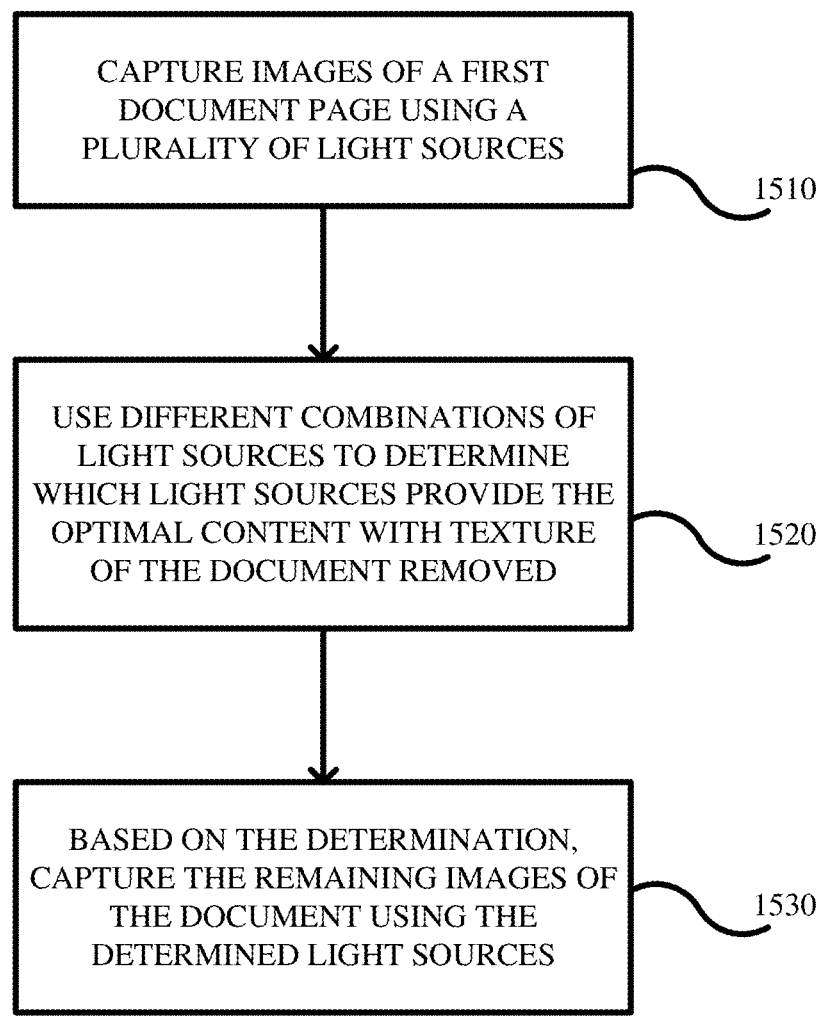
FIG. 15 is a flowchart of a method according to another embodiment wherein a determined combination of light sources are used to capture images of a document.

FIG. 15 shows a flowchart of additional process blocks that can be used to supplement other flowcharts. In process block 1510, images of a first document page can be captured using multiple monochromatic light sources. In one example, 8 different light sources can be used. Each light source is associated with a different wavelength of light and can be used to capture a greyscale image. In process block 1520, different combinations of light sources are used to determine which light source provides the optimal content with texture of the document removed. Thus, images can be captured of the content and of the texture, and different combinations can be made to determine which combination provides the highest grade of visualization of the content. Such a process can be accomplished automatically or manually. Once a determination of which wavelengths are the best, a formula can be generated. For example, if it is determined that 3 images provide the best imaging of the content, then the following formula can be used having wavelengths i, j, and k (which refer to three different wavelengths):

$$F_i+(F_j-F_k)$$

In process block 1530, based on the previous determination, the remaining pages of the document can be captured using the determined light sources and the determined formula can be used to generate greyscale images of the remaining pages. Additionally this combination of determined light sources can be used throughout any further processing of other documents. Thus, such spectral combination need only be done once. Additionally, if the texture and/or type of content vary significantly, the determination of the combination of light spectrums can be recomputed periodically.

Using the above techniques, robust multispectral text extraction can be made on historic documents. In one example, eight images are captured with a different monochromatic wavelength of light. For example, one input image was captured using light with a wavelength of 340 nm (ultraviolet) and another input image was captured using light with a wavelength of 900 nm (infrared). A combination of the eight monochromatic input images can be used to produce a single grey-scale image. That grey-scale image can be used as a single-input into an image binarization technique to achieve results superior to any single input image.

Each of the eight greyscale images in an "image set" depicts the same document as seen under a different spectrum of light. The equations below can be used to compute a composite image to generate a good input for the single-input image binarization method.

$$F_i - F_j \tag{1}$$

$$F_i + (F_j - F_k) \tag{2}$$

Equation (1) represents the possibility that the difference between two well-chosen images could "subtract off" the background texture of an image leaving behind a cleaned image. Equation (2) represents that possibility that the difference between two images may directly approximate the background texture of an image thus producing a "correction term" that could be used to clean a 3rd image. All possible ($F_i$, $F_j$) couples and ($F_i$, $F_j$, $F_k$) tuples can be systematically binarized to determine which provides the best greyscale image.

Figure 16:
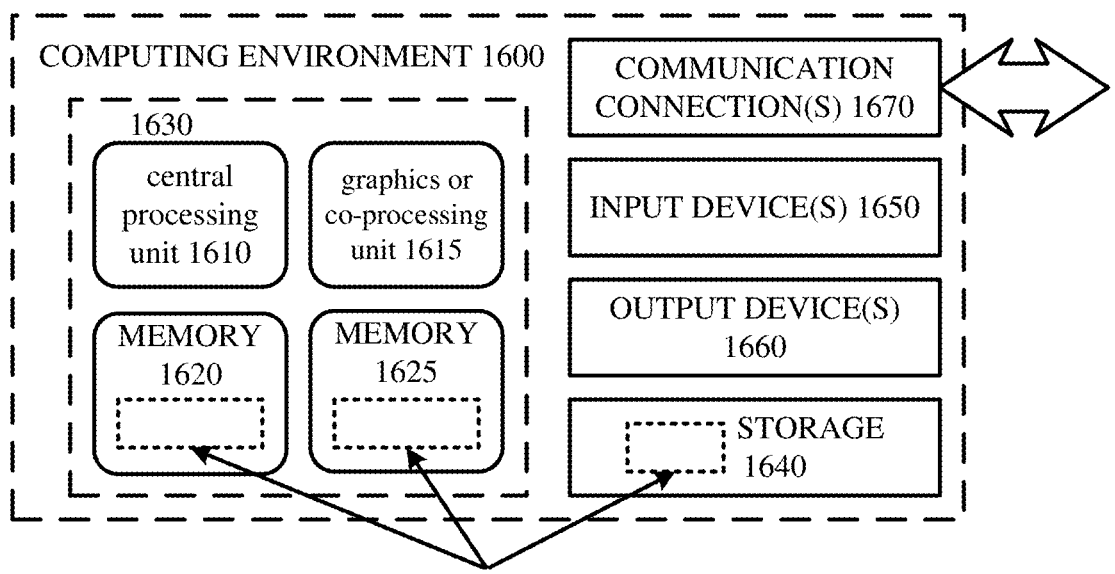
FIG. 16 depicts a generalized example of a suitable computer environment.

FIG. 16 depicts a generalized example of a suitable computing environment 1600 in which the described innovations may be implemented. The computing environment 1600 is not intended to suggest any limitation as to scope of use or functionality, as the innovations may be implemented in diverse general-purpose or special-purpose computing systems. For example, the computing environment 1600 can be any of a variety of computing devices (e.g., desktop computer, laptop computer, server computer, tablet computer, etc.)

With reference to FIG. 16, the computing environment 1600 includes one or more processing units 1610, 1615 and memory 1620, 1625. In FIG. 16, this basic configuration 1630 is included within a dashed line. The processing units 1610, 1615 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 16 shows a central processing unit 1610 as well as a graphics processing unit or co-processing unit 1615. The tangible memory 1620, 1625 may be volatile memory (e.g., registers, cache, RAM), non-volatile memory (e.g., ROM, EEPROM, flash memory, etc.), or some combination of the two, accessible by the processing unit(s). The memory 1620, 1625 stores software 1680 implementing one or more innovations described herein, in the form of computer-executable instructions suitable for execution by the processing unit(s).

A computing system may have additional features. For example, the computing environment 1600 includes storage 1640, one or more input devices 1650, one or more output devices 1660, and one or more communication connections 1670. An interconnection mechanism (not shown) such as a bus, controller, or network interconnects the components of the computing environment 1600. Typically, operating system software (not shown) provides an operating environment for other software executing in the computing environment 1600, and coordinates activities of the components of the computing environment 1600.

The tangible storage 1640 may be removable or non-removable, and includes magnetic disks, magnetic tapes or cassettes, CD-ROMs, RW-CDs, DVDs, or any other medium which can be used to store information in a non-transitory way and which can be accessed within the computing environment 1600. The storage 1640 stores instructions for the software 1680 implementing one or more innovations described herein.

The input device(s) 1650 may be a touch input device such as a keyboard, mouse, pen, or trackball, a voice input device, a scanning device, or another device that provides input to the computing environment 1600. The output device(s) 1660 may be a display, printer, speaker, CD-writer, or another device that provides output from the computing environment 1600.

The communication connection(s) 1670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

The terms "operatively connected" and "operatively coupled", as used herein, mean that the elements so connected or coupled are adapted to transmit and/or receive data, or otherwise communicate. The transmission, reception or communication is between the particular elements, and may or may not include other intermediary elements. This connection/coupling may or may not involve additional transmission media, or components, and may be within a single module or device or between one or more remote modules or devices.

The terms "client" and "server" may describe programs and running processes instead of or in addition to their application to computer systems described above. Generally, a (software) client may consume information and/or computational services provided by a (software) server.

Various embodiments are described herein with respect to scanned image databases and systems related thereto. However, it is to be understood that the embodiments have application to other image data where, inter alia, legibility and readability of obscured image files are desired.

Systems and modules described herein may comprise software, firmware, hardware, or any combination(s) of software, firmware, or hardware suitable for the purposes described herein. Software and other modules may reside on servers, workstations, personal computers, computerized tablets, PDAs, scanners (including handheld scanners), digital cameras and camcorders, and other devices suitable for the purposes described herein. Software and other modules may be accessible via local memory, via a network, via a browser or other application in an ASP context, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein. Except to the extent necessary or inherent in the processes themselves, no particular order to steps or stages of methods or processes described in this disclosure, including the Figures, is implied. In many cases the order of process steps may be varied, and various illustrative steps may be combined, altered, or omitted, without changing the purpose, effect or import of the methods described.

In view of the many possible embodiments to which the principles of the disclosed invention may be applied, it should be recognized that the illustrated embodiments are only preferred examples and should not be taken as limiting the scope of the invention. Rather, the scope of the invention is defined by the following claims. We therefore claim as our invention all that comes within the scope of these claims.

We claim:

1. A method of enhancing imaging of a document, comprising:
    capturing a first image of the document using monochromatic light at a first wavelength, wherein the first image includes content including one or more of the following: typed text or hand written text;
    capturing one or more additional images of the document using monochromatic light at one or more different wavelengths than the first wavelength; and
    combining the first image and the one or more additional images by subtraction to remove texture from document and to extract the content.

2. The method of claim 1, wherein the content includes the typed text, handwritten text in multiple languages, or photographs.

3. The method of claim 1, further including:
    generating a greyscale image based on the combining;
    correcting an erroneous plateau comprising computing a mean and standard deviation of original pixel colors of the first image in an island portion of the erroneous plateau;
    computing a mean and standard deviation of the original pixel colors in a border portion of the erroneous plateau;
    performing a statistical test on the erroneous plateau to determine if the island portion of the erroneous plateau is part of the border portion; and
    if the island portion is a part of the border portion, correcting the erroneous plateau so the island portion and the border portion are a same color value.

4. The method of claim 1, further including generating a greyscale image, wherein the greyscale image is input into any of a plurality of image enhancement algorithms.

5. The method of claim 1, wherein the combining is a linear weighted combination of the first image and the one or more additional images.

6. The method of claim 5, further including normalizing the linear weighted combination.

7. The method of claim 1, wherein the capturing of the first image and the one or more additional images is performed using a camera that digitizes an image of the document.

8. The method of claim 1, wherein the capturing of the first image and the one or more additional images is performed by using a scanner, a digital camera or a camcorder.

9. The method of claim 1, wherein the combining is performed using an equation:

$$F_{bestinput} = \sum_{i=1}^{n} c_i \cdot F_i$$

wherein $F_i$ is an image captured at a wavelength associated with a variable i and $c_i$ is a constant associated with the variable i.

10. The method of claim 1, wherein the medium includes at least one of the following: paper, skin, parchment, leather, film, or cloth.

11. The method of claim 1, further including
    generating a greyscale image based on combining, wherein the greyscale image is input into an image enhancement algorithm that performs the following:
    isolating a plurality of pixels near an edge to generate an edge detected image output;
    isolating locally dark or light pixels to generate a locally dark or light image output; and
    computing an intersection between the edge detected image output and the locally dark or light image output and outputting a combined black and white image.

12. A computer-readable storage medium, which is non-transitory, including instructions that upon execution cause a computer system to:
    capture a first image of a document using a first monochromatic light source at a first wavelength, wherein the first wavelength is chosen for capturing content of the document;
    capture a second image of the document using a second monochromatic light source at a second wavelength, different than the first wavelength, wherein the second wavelength is chosen for capturing a texture or other features of the document; and
    combine at least the first and second images through a subtraction operation to remove the texture from the document.

13. The computer-readable storage medium of claim 12, further including generating a greyscale image usable as input to an image enhancement algorithm through the combining.

14. The computer-readable storage medium of claim 12, wherein the content includes one or more of the following: typed text, photographs, or handwritten text in a plurality of languages.

15. The computer-readable storage medium of claim 12, further including correcting an erroneous plateau comprising:
    computing a mean and standard deviation of original pixel colors of the first image in an island portion of the erroneous plateau;
    computing a mean and standard deviation of the original pixel colors in a border portion of the erroneous plateau;
    determining if the island portion of the erroneous plateau is part of the border portion; and
    correcting the erroneous plateau so the island portion and the border portion are a same color value when the island portion is part of the border portion.

16. The computer-readable storage medium of claim 12, wherein the combining at least the first and second images results in subtracting the texture of the document from the first image and extracting the content.

17. The computer-readable storage medium of claim 12, wherein the capturing is performed using a camera that digitizes an image of the document.

18. The computer-readable storage medium of claim 12, wherein the capturing is performed by using a scanner, a digital camera or a camcorder.

19. The computer-readable storage medium of claim 12, further including instructions to capture a plurality of images using light sources at different wavelengths so as to capture the texture of the document and wherein the combining at least the first and second images includes combining the second image with the plurality of images to obtain an approximation of the texture of the document.

20. The computer-readable storage medium of claim 12, wherein the combining is performed using an equation:

$$F_{bestinput} = \sum_{i=1}^{n} c_i \cdot F_i$$

wherein $F_i$ is an image captured at a wavelength associated with a variable i and $c_i$ is a weighting associated with the variable i.

21. The computer-readable storage medium of claim 12, further including instructions to use the greyscale image as input to an enhancement algorithm, which includes:
 isolating a plurality of pixels near an edge to generate an edge detected image output;
 isolating locally dark or light pixels to generate a locally dark or light image output;
 computing an intersection between the edge detected image output and the locally dark or light image output and outputting a combined black and white image; and
 cleaning the outputted combined image.

* * * * *